United States Patent
Nakadoi et al.

(10) Patent No.: US 12,386,173 B2
(45) Date of Patent: Aug. 12, 2025

(54) VIBRATION DEVICE AND IMAGING DEVICE

(71) Applicant: Murata Manufacturing Co., Ltd., Nagaokakyo (JP)

(72) Inventors: Takahide Nakadoi, Nagaokakyo (JP); Nobumasa Kitamori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 172 days.

(21) Appl. No.: 18/135,338

(22) Filed: Apr. 17, 2023

(65) Prior Publication Data

US 2023/0258925 A1    Aug. 17, 2023

Related U.S. Application Data

(63) Continuation of application No. PCT/JP2021/037390, filed on Oct. 8, 2021.

(30) Foreign Application Priority Data

Oct. 28, 2020   (JP) .................................. 2020-180765

(51) Int. Cl.
*G02B 27/00* (2006.01)
*B06B 1/06* (2006.01)
(Continued)

(52) U.S. Cl.
CPC ............ *G02B 27/0006* (2013.01); *B06B 1/06* (2013.01); *B06B 1/0655* (2013.01); *G03B 15/00* (2013.01);
(Continued)

(58) Field of Classification Search
CPC ..... G02B 27/0006; B06B 1/06; B06B 1/0655; B06B 2201/77; G03B 15/00; G03B 17/02; G03B 17/56
See application file for complete search history.

(56) References Cited

U.S. PATENT DOCUMENTS

2003/0214599 A1* 11/2003 Ito .......................... H04N 23/52
                                                           348/335
2009/0262232 A1* 10/2009 Kim ........................ G02B 7/102
                                                           348/340
(Continued)

FOREIGN PATENT DOCUMENTS

| JP | 09223910 A    | 8/1997  |
| JP | 2017170303 A  | 9/2017  |
| JP | 2019536018 A  | 12/2019 |

OTHER PUBLICATIONS

English machine translation of Masuyama et al. JP H09223910 (Year: 1997).*

(Continued)

*Primary Examiner* — Dominic J Bologna
(74) *Attorney, Agent, or Firm* — Keating & Bennett, LLP

(57) ABSTRACT

A vibration device includes a tubular vibration body, a retainer fixed to the vibration body, and a light transmissive body to be vibrated by the vibration body and held between the vibration body and the retainer. The light transmissive body includes a first surface and a second surface opposed to the first surface. The vibration body includes one end supporting the first surface of the light transmissive body. The retainer includes a side wall including a first end and a second end surrounding an outer circumference of the light transmissive body, and a supporting portion extending inwardly with respect to the side wall from the first end of the side wall. The retainer is fixed to the vibration body at a portion in contact with the vibration body on a side of the second end. The supporting portion includes a supporting surface on a side of the second surface of the light transmissive body to support the second surface of the light transmissive body.

20 Claims, 19 Drawing Sheets

(51) Int. Cl.
      *G03B 15/00*      (2021.01)
      *G03B 17/02*      (2021.01)
      *G03B 17/56*      (2021.01)

(52) U.S. Cl.
      CPC ............. *G03B 17/02* (2013.01); *G03B 17/56* (2013.01); *B06B 2201/77* (2013.01)

(56) References Cited

U.S. PATENT DOCUMENTS

| | | | |
|---|---|---|---|
| 2018/0095272 A1* | 4/2018 | Fujimoto | G03B 17/56 |
| 2018/0117642 A1* | 5/2018 | Magee | G01H 1/00 |
| 2019/0033685 A1* | 1/2019 | Fujimoto | H04N 23/55 |
| 2020/0284741 A1* | 9/2020 | Magee | B06B 1/0292 |

OTHER PUBLICATIONS

International Search Report in PCT/JP2021/037390, mailed Dec. 21, 2021, 3 pages.
Written Opinion in PCT/JP2021/037390, mailed Dec. 21, 2021, 4 pages.

* cited by examiner

VIBRATION DEVICE AND IMAGING DEVICE

CROSS REFERENCE TO RELATED APPLICATIONS

This application claims the benefit of priority to Japanese Patent Application No. 2020-180765 filed on Oct. 28, 2020 and is a Continuation Application of PCT Application No. PCT/JP2021/037390 filed on Oct. 8, 2021. The entire contents of each application are hereby incorporated herein by reference.

BACKGROUND OF THE INVENTION

1. Field of the Invention

The present invention relates to a vibration device and an imaging device including the vibration device.

2. Description of the Related Art

A droplet removal device which removes a droplet or the like adhering to a luminous flux passing range of a drip-proof cover drip-proof is known.

For example, Japanese Unexamined Patent Application Publication No. 2017-170303 discloses a droplet removal device provided with an excitation member which is connected to an end portion of a curved surface forming a dome part of an optical element, and causes flexural vibration to the dome part.

The droplet removal device described in Japanese Unexamined Patent Application Publication No. 2017-170303 controls the excitation member to remove a droplet or the like adhering to the dome part by causing vibration to be applied to the dome part and miniaturizing the droplet or the like.

SUMMARY OF THE INVENTION

The droplet removal device described in Japanese Unexamined Patent Application Publication No. 2017-170303 still has room for improvement in terms of improving reliability of a joint portion.

Therefore, preferred embodiments of the present invention provide vibration devices and imaging devices in which reliability of a joint portion between a light transmissive body and a vibration body is improved.

A vibration device according to an aspect of a preferred embodiment of the present invention includes a tubular vibration body, a retainer fixed to the vibration body, and a light transmissive body to be vibrated by the vibration body and held between the vibration body and the retainer.

An imaging device according to an aspect of a preferred embodiment of the present invention includes the vibration device described above and an imaging element inside the vibration device.

According to preferred embodiments of the present invention, the vibration devices and the imaging devices in each of which reliability of the joint portion between the light transmissive body and the vibration body is improved can be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
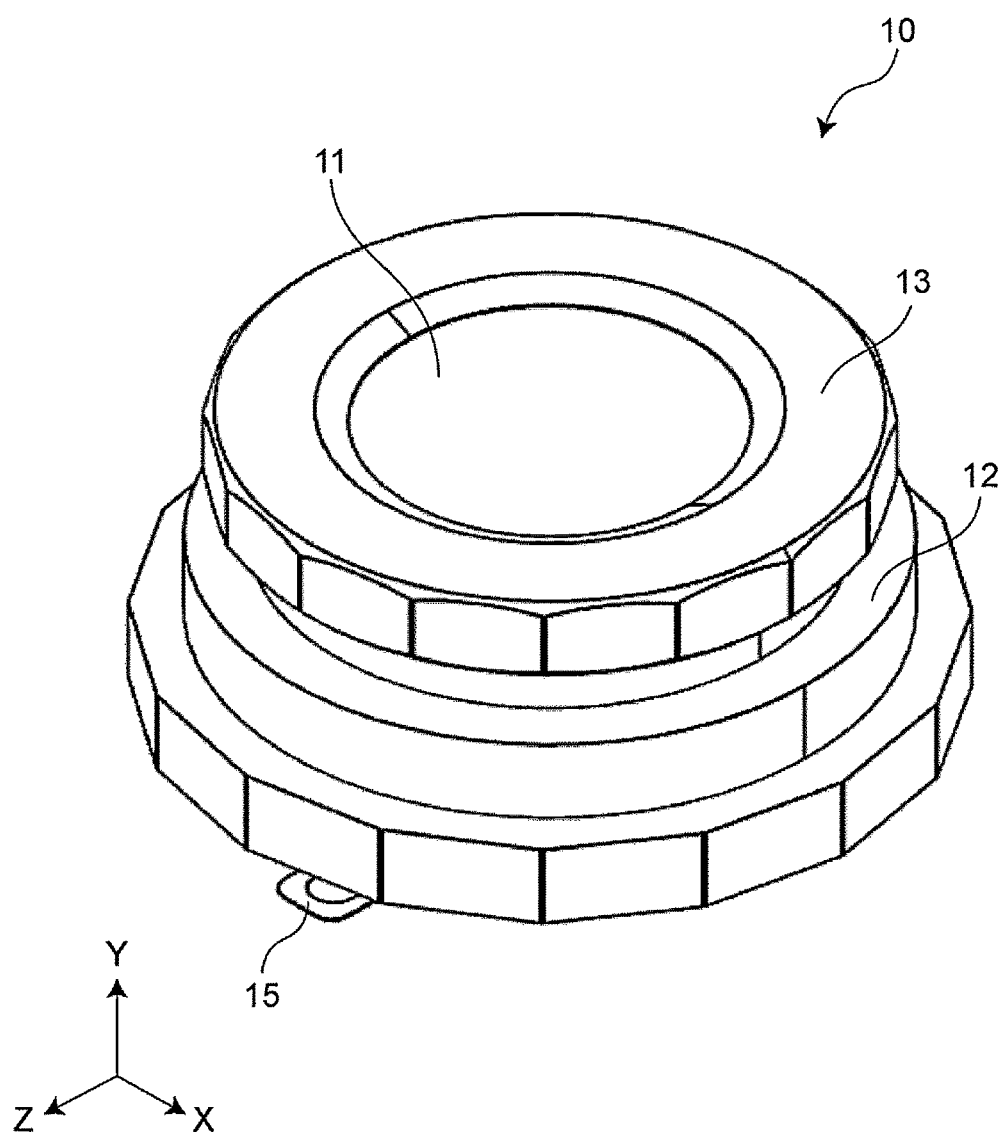
FIG. 1 is a perspective view of a vibration device according to Preferred Embodiment 1 of the present invention.

Background of Preferred Embodiments of the Present Invention

Cameras which are used outdoors (for example, car-mounted cameras, surveillance cameras, and cameras mounted on drones) are provided with a cover made of glass, transparent plastic, or the like so as to cover a lens because the camera may be weathered. When foreign matters, such as mud or oil, adhere to the cover, the foreign matters unexpectedly appear in an image captured by the camera, and a clear image is not always obtained since a field of vision of the camera is obstructed.

Therefore, a device like the droplet removal device described in Japanese Unexamined Patent Application Publication No. 2017-170303 has been examined. The device removes a droplet or the like adhering to a drip-proof cover by a piezoelectric material being provided to the drip-proof cover and generating flexural vibration in the drip-proof cover and miniaturize the droplet or the like.

In the droplet removal device described in Japanese Unexamined Patent Application Publication No. 2017-170303, a flange portion of the drip-proof cover and the piezoelectric material are fixed to each other by adhesive, and a drip-proof seal formed in a circular annular shape is disposed to be closely fitted to the entire circumference of an outer circumferential edge portion of the flange portion.

However, in the configuration described in Japanese Unexamined Patent Application Publication No. 2017-170303, since the drip-proof seal is made of rubber material, it cannot firmly hold the drip-proof cover and the piezoelectric material, and the drip-proof cover and the piezoelectric material may separate from each other. Particularly, separation of the drip-proof cover and the piezoelectric material is likely to occur in an environment at a high temperature and a high humidity. Therefore, improving reliability of the joint portion between the drip-proof cover and the piezoelectric material in the environment at a high temperature and a high humidity is an issue. The joint portion between the drip-proof cover and the piezoelectric material indicates a portion where the drip-proof cover and the piezoelectric material adhere to each other. Further, the reliability of the joint portion means unlikeliness of separation and high strength at the joint portion between the drip-proof cover and the piezoelectric material.

Further, there is a problem that, since the drip-proof seal has a property of absorbing vibration, it becomes a cause of vibration loss upon transmitting vibration of the piezoelectric material to the drip-proof cover.

Therefore, the present inventors examined a configuration which improves reliability of a joint portion between a cover glass and a vibration body by the cover glass being held by a retainer and the vibration body, and thus conceived of and developed the following preferred embodiments of the present invention.

A vibration device according to an aspect of a preferred embodiment of the present invention includes a tubular vibration body, a retainer fixed to the vibration body, and a light transmissive body to be vibrated by the vibration body and held between the vibration body and the retainer.

In this configuration, the vibration device in which reliability of the joint portion between the light transmissive body and the vibration body is improved can be provided.

The light transmissive body may include a first surface and a second surface opposed to the first surface, the vibration body may include one end and support the first surface of the light transmissive body at the one end, the retainer may include a side wall including a first end and a second end and surrounding an outer circumference of the light transmissive body, and a supporting portion extending inwardly with respect to the side wall from the first end of the side wall, the retainer may be fixed to the vibration body at a portion in contact with the vibration body on a side of the second end, and the supporting portion may include a supporting surface located on a side of the second surface of the light transmissive body to support the second surface of the light transmissive body.

In this configuration, the vibration device in which reliability of the joint portion between the light transmissive body and the vibration body is improved can be provided. By the light transmissive body being supported while being sandwiched between the vibration body and the supporting portion of the retainer, separation at the joint portion between the light transmissive body and the vibration body can be prevented.

At least one of adhesion between the one end of the vibration body and the first surface of the light transmissive body or adhesion between the supporting surface of the retainer and the second surface of the light transmissive body may be provided by adhesive.

In this configuration, the joint portion between the light transmissive body and the vibration body can firmly be fixed, and separation can be prevented.

The supporting portion of the retainer may include a first supporting portion extending inwardly with respect to the side wall from the first end of the retainer, and a second supporting portion projecting toward the second surface of the light transmissive body from a tip end of the first supporting portion and including the supporting surface, and a space may be provided between the first supporting portion and the second surface of the light transmissive body.

In this configuration, by the second supporting portion of the retainer being provided, the light transmissive body can be supported at the inner side portion where amplitude is large. Therefore, stress applied to the joint portion between the light transmissive body and the vibration body can be reduced or prevented. Thus, reliability of the joint portion between the light transmissive body and the vibration body can further be improved.

A width of the second supporting portion of the retainer in a direction in which the supporting portion extends may be about 0.3 times or larger and about 3 times or smaller a thickness of the first supporting portion, for example.

In this configuration, reliability of the joint portion between the light transmissive body and the vibration body can further be improved.

The light transmissive body may have a circular or substantially circular plate shape, the vibration body and the retainer may have a cylindrical or substantially cylindrical shape, and an inner diameter of the supporting portion of the retainer may be equal to or larger than an inner diameter of the vibration body and smaller than about one-half of a sum of the inner diameter of the vibration body and an outer diameter of the light transmissive body.

In this configuration, a field of view of a camera inside the vibration device can be widened while reliability of the joint portion is improved.

The light transmissive body may have a circular or substantially circular plate shape, the vibration body and the retainer may have a cylindrical or substantially cylindrical shape, and an inner diameter of the supporting portion of the retainer may be smaller than an inner diameter of the vibration body and smaller than about one-half of the sum of the inner diameter of the vibration body and an outer diameter of the light transmissive body.

In this configuration, since a contact area between the retainer and the light transmissive body increases, the light transmissive body can be fixed further firmly.

The vibration body may have a second threaded portion on a side of the one end of the vibration body, and the retainer may have a first threaded portion on the side of the second end to be threadedly engaged with the second threaded portion.

In this configuration, the retainer and the vibration body can firmly be fixed to each other.

The retainer and the vibration body may be fixed to each other by a plurality of screws.

In this configuration, the retainer and the vibration body can be fixed to each other easily and at low cost.

The supporting portion of the retainer may include one or a plurality of plate springs.

In this configuration, the manufacturing cost of the vibration device can be reduced.

A groove extends continuously along an inner circumference of the retainer in a surface of the supporting portion of the retainer opposed to the second surface of the light transmissive body, and a seal is provided to the groove.

In this configuration, entry of foreign matters through space between the retainer and the light transmissive body can be prevented.

The light transmissive body may include a body portion, and a frame portion at an outer edge of the body portion and having a thickness smaller than a thickness of the body portion, the supporting portion of the retainer may support the frame portion, and the thickness of the frame portion may be about one-tenth or larger and about nine-tenth or smaller of the thickness of the body portion.

In this configuration, the field of view of the camera inside the vibration device can be widened while reliability of the joint portion between the light transmissive body and the vibration body is improved.

An imaging device according to an aspect of a preferred embodiment of the present invention includes the vibration device described above, and an imaging element inside the vibration device.

Hereinafter, preferred embodiments of the present invention are described with reference to the accompanying drawings. Note that the following description is not intended to limit the present disclosure, application, or usage thereof. Further, the drawings are schematic drawings, and each dimensional ratio or the like does not always match the actual one.

Preferred Embodiment 1

Overall Configuration

Figure 2A:
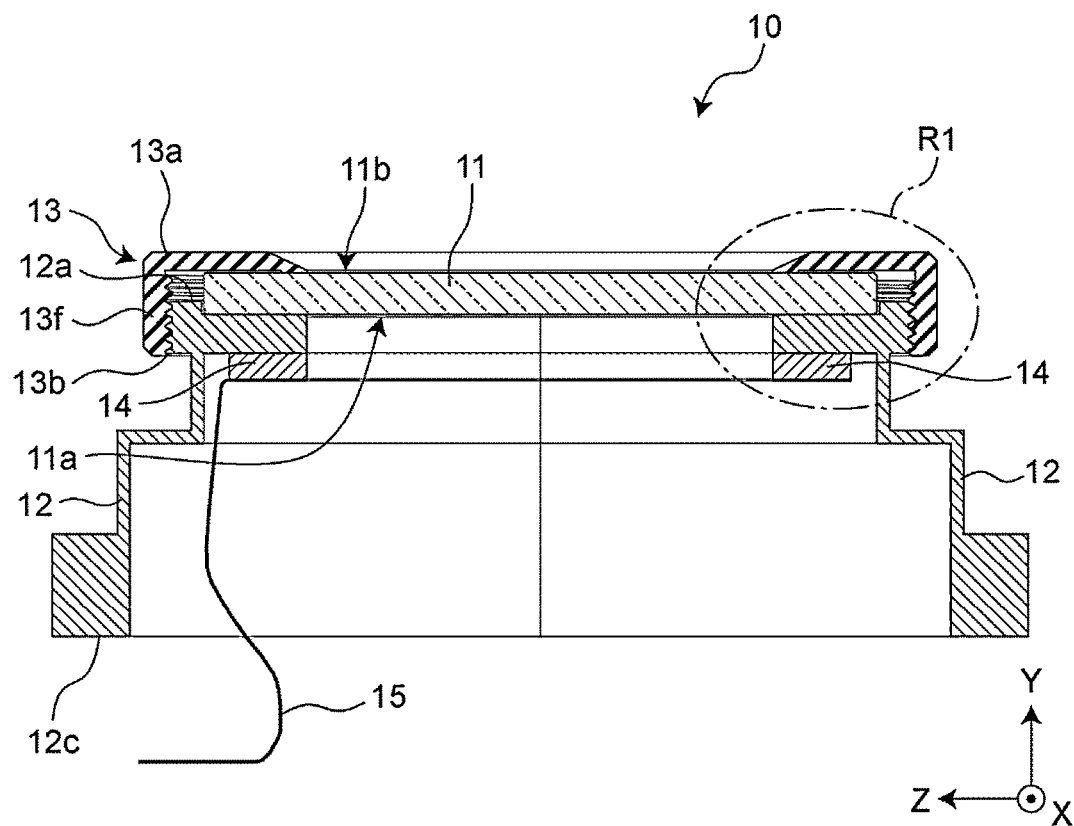
FIG. 2A is a sectional view of the vibration device in FIG. 1.
Figure 2B:
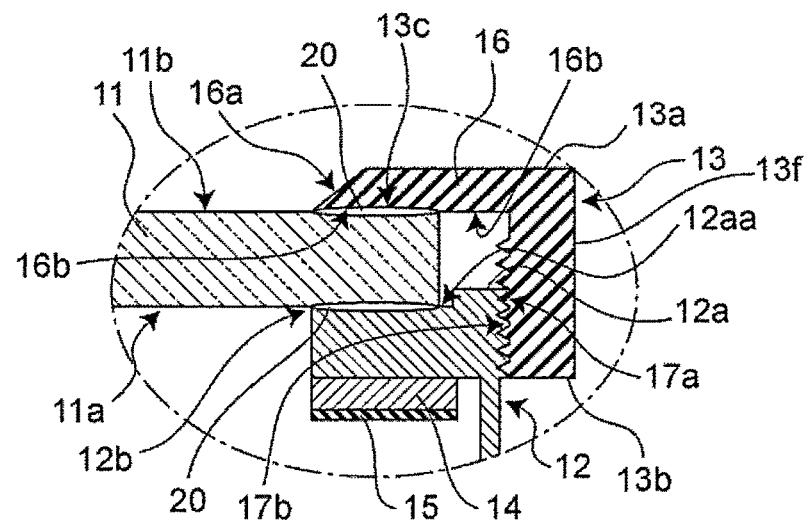
FIG. 2B is an enlarged view of a region R1 in FIG. 2A.
Figure 3:
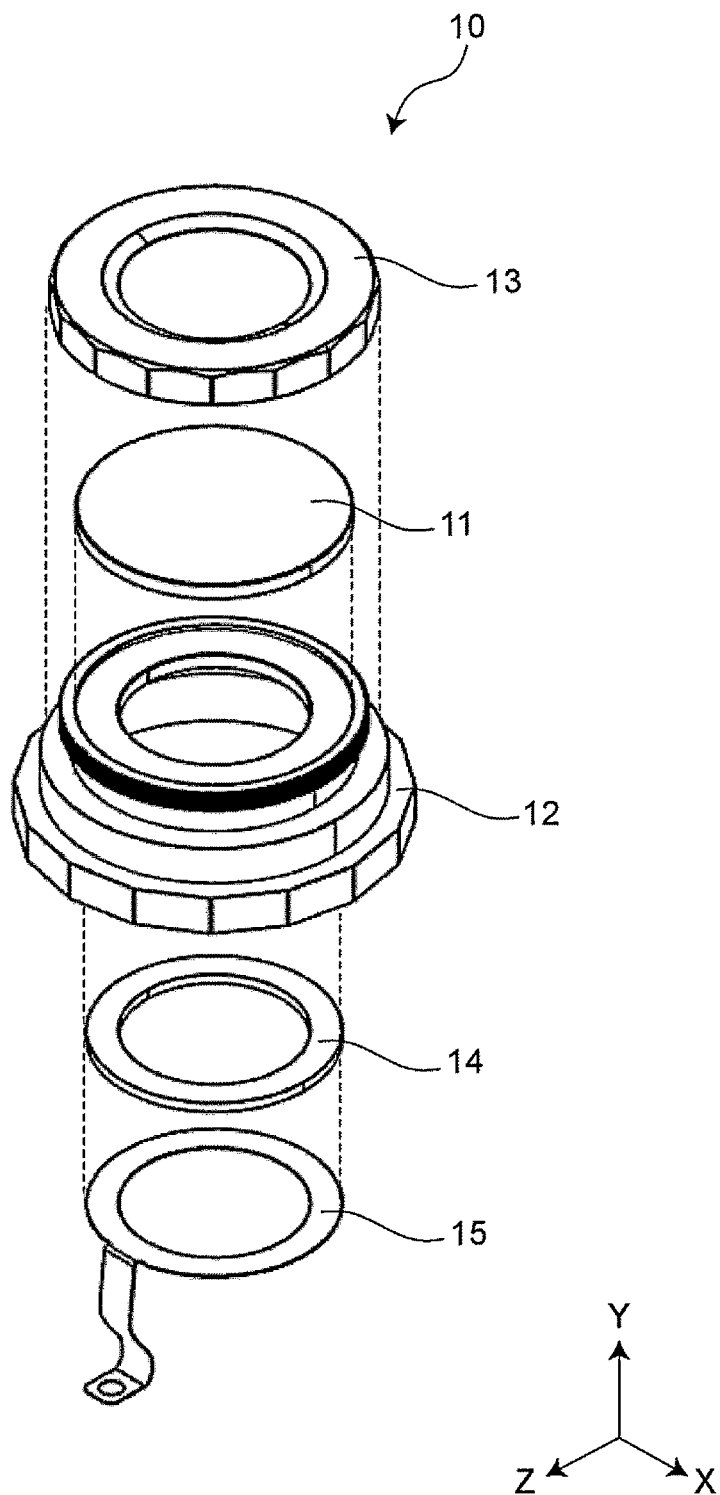
FIG. 3 is an exploded perspective view illustrating components of the vibration device in FIG. 1.
Figure 4:
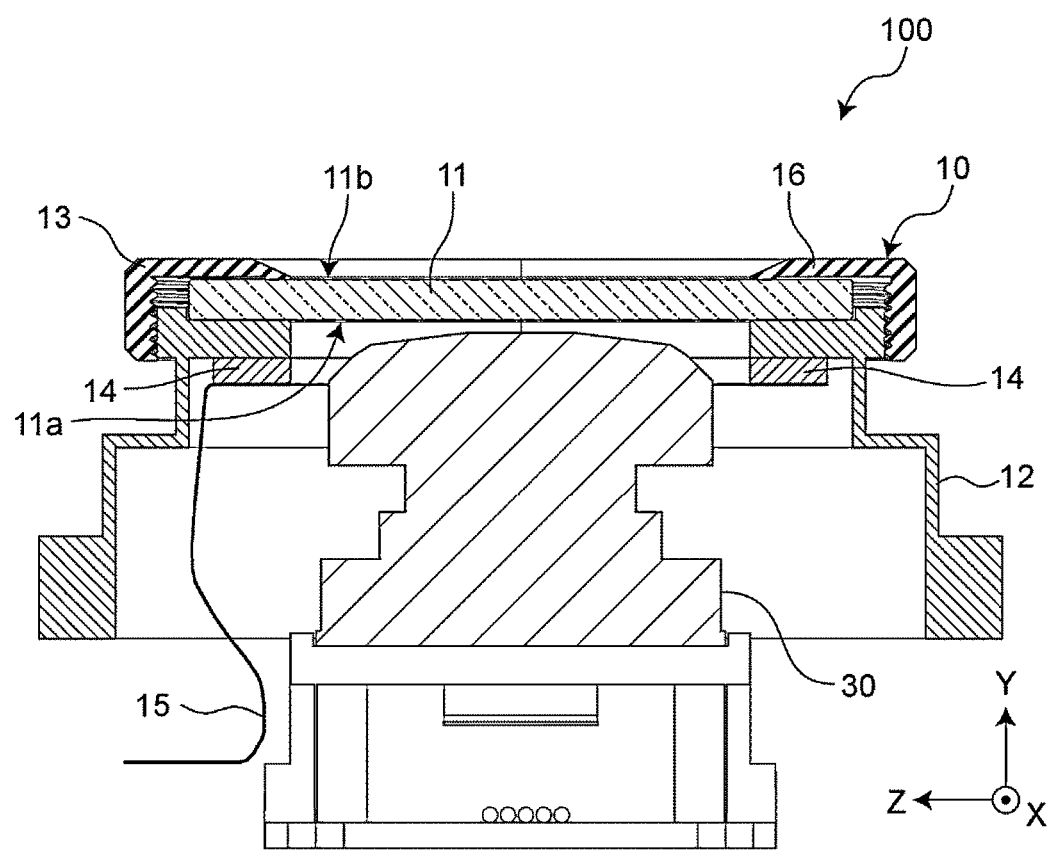
FIG. 4 is a sectional view illustrating an imaging device including the vibration device in FIG. 1.

FIG. 1 is a perspective view of a vibration device 10 according to Preferred Embodiment 1. FIG. 2A is a sectional view of the vibration device 10 in FIG. 1. FIG. 2B is an enlarged view of a region R1 in FIG. 2A. FIG. 3 is an exploded perspective view illustrating components of the vibration device 10 in FIG. 1. FIG. 4 is a sectional view illustrating an imaging device 100 including the vibration device 10 in FIG. 1.

As illustrated in FIG. 1, the vibration device 10 according to Preferred Embodiment 1 includes a light transmissive body 11, a vibration body 12, and a retainer 13. In this preferred embodiment, the vibration device 10 is a device which removes a water droplet or the like adhering to the light transmissive body 11 by the vibration body 12 transmitting vibration of a piezoelectric material 14 fixed to the vibration body 12 to the light transmissive body 11 and vibrates the light transmissive body 11. Moreover, in this preferred embodiment, the vibration device 10 is provided with a conductor 15 which applies electric potential to the piezoelectric material 14.

As illustrated in FIG. 4, the imaging device 100 according to Preferred Embodiment 1 includes the vibration device 10 and an imaging part 30. The imaging part 30 is disposed inside the vibration device 10. The imaging part 30 includes, for example, an optical element, an imaging element, a sensor component, and so forth, and is provided with a case component which accommodates the incorporated component. The imaging part 30 captures an image of an imaging target object located outside of the vibration device 10 through the light transmissive body 11 of the vibration device 10.

Components of the vibration device 10 will be described below in detail.

Light Transmissive Body

As illustrated in FIGS. 2A and 2B, the light transmissive body 11 includes a first surface 11*a* and a second surface 11*b* opposed to the first surface 11*a*, and has a plate shape. As illustrated in FIG. 4, the light transmissive body 11 is a cover which prevents a foreign matter from adhering to a lens of the imaging part 30 when the imaging part 30 is disposed inside the vibration device 10.

The first surface 11*a* of the light transmissive body 11 is supported by the vibration body 12, and the second surface 11*b* of the light transmissive body 11 is supported by a supporting portion 16 of the retainer 13. That is, the light transmissive body 11 is supported by being sandwiched between the vibration body 12 and the supporting portion 16 of the retainer 13. In other words, the supporting portion 16 of the retainer 13 presses the second surface 11*b* of the light transmissive body 11 in a direction intersecting with the second surface 11*b*. In detail, the supporting portion 16 of the retainer 13 presses the second surface 11*b* of the light transmissive body 11 in a direction vertical to the second surface 11*b*.

As a material of the light transmissive body 11, for example, glass (for example, soda glass, borosilicate glass, aluminosilicate glass, or quartz glass), light transmissive plastic, a light transmissive ceramic material, or synthetic resin can be used. Strength of the light transmissive body 11 can be improved by the light transmissive body 11 being made of tempered or toughened glass whose strength is improved by, for example, chemical strengthening.

In this preferred embodiment, as illustrated in FIG. 3, the light transmissive body 11 preferably has a circular or substantially circular plate shape, for example. In detail, the light transmissive body 11 preferably has a circular or substantially circular shape when seen in a thickness direction (Y direction).

The first surface and the second surface of the light transmissive body 11 may be applied with coating, such as AR coating, water repellent coating, or impact resistance coating, as necessary.

Vibration Body

The vibration body 12 is a tubular member having one end 12*a*. The one end 12*a* of the vibration body 12 supports the first surface 11*a* of the light transmissive body 11. In detail, an end surface of the one end 12*a* of the vibration body 12 supports an outer edge portion of the first surface 11*a* of the light transmissive body 11. In this preferred embodiment, as illustrated in FIG. 2B, a surface 12*aa* which supports the first surface 11*a* of the light transmissive body 11 is provided to the one end 12*a* of the vibration body 12. The outer edge portion of the first surface 11*a* of the light transmissive body 11 is mounted on the surface 12*aa* of the vibration body 12, and the outer edge portion of the first surface 11*a* of the light transmissive body 11 and the surface 12*aa* of the vibration body 12 is joined to each other, thus the first surface 11a of the light transmissive body 11 being supported by the vibration body 12.

The vibration body 12 receives vibration of the piezoelectric material 14 described later to cause the light transmissive body 11 to vibrate.

As material of the vibration body 12, metal, such as stainless steel, aluminum, iron, titanium, or duralumin, can be used. In order to reduce loss of vibration transmitted from the piezoelectric material 14 to the light transmissive body 11, the vibration body 12 is desirably made of material with high rigidity.

In this preferred embodiment, the one end 12a of the vibration body 12 and the light transmissive body 11 are fixed to each other by adhesive. In this case, in order to improve adhesion of the adhesive, a surface of the vibration body 12 is preferably applied with oxidation treatment or alumite treatment.

As illustrated in FIG. 2B, the vibration body 12 has a first threaded portion 17b on a side of the one end 12a. The first threaded portion 17b is threadedly engaged with a second threaded portion 17a of the retainer 13. In this preferred embodiment, the first threaded portion 17b is a male thread provided to an outer circumference of the vibration body 12 on the one end 12a side.

As illustrated in FIG. 3, in this preferred embodiment, the vibration body 12 preferably has a cylindrical or substantially cylindrical shape corresponding to the shape of the light transmissive body 11. In order to efficiently transmit vibration of the piezoelectric material 14 to the light transmissive body 11, in this preferred embodiment, the vibration body 12 preferably is formed in a shape in which cylinders having diameters different from each other are combined together. In detail, the vibration body 12 is formed such that its outer diameter becomes larger gradually from the one end 12a to an other end 12c. Since the vibration body 12 preferably has such a shape, vibration of the piezoelectric material 14 can efficiently be transmitted to the light transmissive body 11.

In this preferred embodiment, a portion of the outer circumference of the vibration body 12 preferably has a hexadecagonal shape, for example. Since the outer circumference of the vibration body 12 is formed in such manner, the vibration body 12 can easily be held by a tool when the first threaded portion 17b and the second threaded portion 17a are threadedly engaged with each other. Therefore, the first threaded portion 17b and the second threaded portion 17a can firmly be tightened together. Moreover, numerical control of an amount of tightening torque becomes easier. Note that the shape of the outer circumference of the vibration body 12 is not limited to the hexadecagonal shape, but may be a polygonal shape (for example, an octagonal shape or an icosagonal shape), an oval shape, or a shape having a cut therein for a screwdriver.

Retainer

As illustrated in FIGS. 1 to 3, the retainer 13 has a side wall 13f and the supporting portion 16. The side wall 13f of the retainer 13 has one end 13a and an other end 13b and surrounds the outer circumference of the light transmissive body 11. The supporting portion 16 of the retainer 13 extends inwardly with respect to the side wall 13f from the one end 13a. In this preferred embodiment, as illustrated in FIG. 3, the retainer 13 preferably has a ring shape. That is, the supporting portion 16 of the retainer 13 is formed to extend inwardly from the one end 13a of the side wall 13f preferably having a ring shape. As illustrated in FIG. 2B, the supporting portion 16 is located on the second surface 11b side of the light transmissive body 11, and includes a supporting surface 16b which presses the second surface 11b of the light transmissive body 11. Moreover, the retainer 13 is fixed to the vibration body 12 at a portion in contact with the vibration body 12 on the other end 13b side. That is, the retainer 13 and the vibration body 12 are fixed to each other such that the inner side (inner wall portion) of the side wall 13f of the retainer 13 contacts the vibration body 12 on the other end 13b side of the retainer 13.

As material of the retainer 13, metal, such as stainless steel, aluminum, iron, titanium, or duralumin, can be used. A surface of the retainer 13 may be applied with oxidation treatment or alumite treatment similarly to the vibration body 12.

As illustrated in FIG. 2B, the supporting portion 16 of the retainer 13 is formed to extend inwardly with respect to the side wall 13f from the one end 13a of the retainer 13. The supporting portion 16 has the supporting surface 16b which supports the second surface 11b of the light transmissive body 11. The supporting surface 16b of the supporting portion 16 of the retainer 13 supports an outer edge portion of the second surface 11b of the light transmissive body 11. In this preferred embodiment, the supporting surface 16b of the retainer 13 is adhered to the second surface 11b of the light transmissive body 11 by an adhesive 20.

Since the supporting portion 16 is formed to extend inwardly with respect to the side wall 13f from the one end 13a of the retainer 13, the retainer 13 preferably has a circular or substantially circular annular shape when seen from above (in the Y direction).

The supporting portion 16 of the retainer 13 includes a slope surface 16a at its tip end. By the supporting portion 16 of the retainer 13 including the slope surface 16a, it becomes easier to flow out a water droplet or the like adhering to the light transmissive body 11. The slope surface 16a preferably defines an angle with respect to the second surface 11b of the light transmissive body 11 equal to or larger than about 10° and equal to or smaller than about 80°, for example. More preferably, the slope surface 16a may define an angle with respect to the second surface 11b of the light transmissive body 11 equal to or larger than about 30° and equal to or smaller than about 60°, for example.

In this preferred embodiment, as illustrated in FIG. 2B, the second threaded portion 17a is formed in the retainer 13 on the other end 13b side. The second threaded portion 17a is threadedly engaged with the first threaded portion 17b formed in the vibration body 12. That is, by the first threaded portion 17b and the second threaded portion 17a being threadedly engaged to each other, the retainer 13 is fixed to the vibration body 12 on the other end 13b side. Being fixed to the vibration body 12 on the other end 13b side means that the retainer 13 and the vibration body 12 are fixed to each other at a position closer to the other end 13b than to the one end 13a of the retainer 13, or at a position closer to the other end 13b than the middle in the height direction (Y direction) of the retainer 13. In this preferred embodiment, the second threaded portion 17a is a female thread formed in the inner wall of the retainer 13 on the other end 13b side.

In this preferred embodiment, the retainer 13 preferably has a circular or substantially circular annular shape corresponding to the shape of the light transmissive body 11. Moreover, as illustrated in FIGS. 1 and 3, an outer circumference of the retainer 13 preferably has a hexadecagonal shape. Since the outer circumference of the retainer 13 is formed in such manner, the retainer 13 can easily be held by a tool when the first threaded portion 17b and the second threaded portion 17a are threadedly engaged with each other. Therefore, the first threaded portion 17b and the second threaded portion 17a can firmly be tightened together. Moreover, numerical control of an amount of tightening torque becomes easier.

Note that the shape of the outer circumference of the retainer 13 is not limited to the hexadecagonal shape, but may be a polygonal shape (for example, an octagonal shape or an icosagonal shape), an oval shape, or a shape having a cut therein for a screwdriver. In the case of having a polygonal shape, the polygonal shape may be an octagon or with more corners so as to maintain vibration performance. In this case, an influence of oscillation due to parasitic vibration which is called "spurious oscillation" can be reduced.

Adhesive

As illustrated in FIG. 2B, in this preferred embodiment, the adhesive 20 is applied to a joint portion 12b between the light transmissive body 11 and the vibration body 12, a joint portion 13c between the light transmissive body 11 and the supporting surface 16b of the supporting portion 16 of the retainer 13, and the joint portion between the first threaded portion 17a and the second threaded portion 17b. Note that the adhesive 20 is not an essential component, and the application thereof is not always necessary.

As material of the adhesive 20, hard organic material, such as epoxy resin, can be used. Alternatively, as material of the adhesive 20, inorganic material, such as cement or a glass frit, may be used. In order to reduce transmission loss of vibration, adhesive with high Young's modulus is preferably used. The adhesive 20 may include a filler having a particle diameter of approximately 10 μm, for example.

By the adhesive 20 being mixed with the filler, when the vibration body 12 and the retainer 13 are fastened to be fixed to each other by the threaded engagement between the first threaded portion 17a and the second threaded portion 17b, the thickness of the adhesive 20 applied to the joint portions 12b and 13c can be maintained independent from the tightening torque. By the thickness of the adhesive 20 being maintained, it becomes possible to reduce influence of unevenness of the surface of each component, and improve peel strength.

In this preferred embodiment, the adhesive 20 is filled to the joint portion 12b between the light transmissive body 11 and the vibration body 12, and the joint portion 13c between the light transmissive body 11 and the supporting surface 16b of the retainer 13, and the retainer 13 is fastened before the adhesive 20 is hardened. After the retainer 13 is fastened and the first threaded portion 17b and the second threaded portion 17a are threadedly engaged with each other, the adhesive 20 is hardened. By the joint portions between the light transmissive body 11 and the vibration body 12, and between the light transmissive body 11 and the retainer 13 being formed as described above, a force to hold the light transmissive body 11 while sandwiching it between the vibration body 12 and the retainer 13 can be maintained. Moreover, in this preferred embodiment, the adhesive 20 is also filled between the first threaded portion 17a and the second threaded portion 17b, and also plays role as a loosening stopper of the thread.

Piezoelectric Material

The piezoelectric material 14 is fixed to the vibration body 12. In this preferred embodiment, the piezoelectric material 14 and the vibration body 12 are fixed to each other by adhesive. For example, the piezoelectric material 14 vibrates by being applied with voltage.

As illustrated in FIG. 3, in this preferred embodiment, the piezoelectric material 14 preferably has a circular or substantially circular annular plate shape. The shape of the piezoelectric material 14 is not limited to a circular or substantially circular annular plate shape and may be any shape that enables vibrating of the vibration body 12.

As a material forming the piezoelectric material 14, a suitable piezoelectric ceramic material (for example, barium titanate ($BaTiO_3$), lead zirconate titanate (PZT: $PbTiO_3$/$PbZrO_3$), lead titanate ($PbTiO_3$), lead metaniobate ($PbNb_2O_6$), bismuth titanate ($Bi_4Ti_3O_{12}$), or $(K,Na)NbO_3$), or suitable piezoelectric single crystals, such as $LiTaO_3$ or $LiNbO_3$, can be used.

As illustrated in FIGS. 2A and 3, the piezoelectric material 14 is provided with the conductor 15 to apply voltage to the piezoelectric material 14. As material of the conductor 15, metal having high conductivity, such as stainless steel or copper, can be used, for example. Alternatively, the conductor 15 may be wiring formed on flexible printed circuits (FPC). The FPC is a widely used technique, and as a typical example, FPC which is wiring-formed by copper foil on a polyimide substrate is known.

In the case of using the FPC, since it has flexibility, voltage can be applied to the piezoelectric material 14 without impeding vibration.

Comparison with Comparative Example and Reference Example

Figure 5:
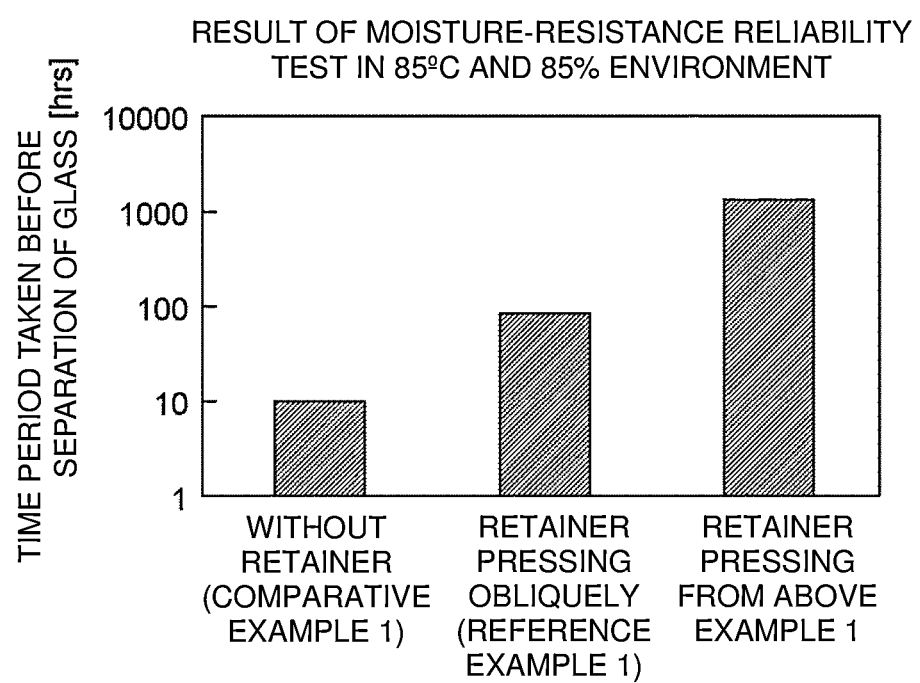
FIG. 5 is a graph illustrating a time period taken before separation occurs at a joint portion between a light transmissive body and a vibration body in an environment at a temperature of about 85° C. and a humidity of about 85%.

FIG. 5 is a graph illustrating a time period taken before separation occurs at a joint portion between a light transmissive body and a vibration body in an environment at a temperature of about 85° C. and a humidity of about 85%, for example. In FIG. 5, a period of time taken before separation in each of a vibration device of Comparative Example 1 which is not provided with a retainer (without retainer), a vibration device of Reference Example 1 provided with a retainer without a supporting portion (retainer pressing obliquely), and the vibration device 10 of Preferred Embodiment 1 (Example 1) (retainer pressing from above) is illustrated. In the vibration device of Reference Example 1, an outer circumferential edge of a light transmissive body is chamfered, and the retainer obliquely supports the outer circumferential edge of the light transmissive body.

As illustrated in FIG. 5, in the vibration device of Comparative Example 1 (without retainer), in an environment at a temperature of 85° C. and a humidity of 85%, separation between the light transmissive body and the vibration body occurs in approximately ten hours. Moreover, in the vibration device of Reference Example 1 (retainer pressing obliquely), in the same environment, the separation occurs in approximately one hundred hours. On the other hand, in the vibration device 10 of Example 1 (retainer pressing from above), in the same environment, the separation does not occur even after one thousand hours. As described above, by the retainer 13 being provided with the supporting portion 16 having the supporting surface 16b to support the second surface 11b of the light transmissive body 11, reliability of the joint portion in the high-temperature and high-humidity environment is largely improved.

Effects

By the vibration device 10 and the imaging device 100 according to Preferred Embodiment 1, the following effects can be achieved.

The vibration device 10 includes the light transmissive body 11, the vibration body 12, and the retainer 13. The light transmissive body 11 has a plate shape including the first surface 11a and the second surface 11b opposed to the first surface 11a. The vibration body 12 is a tubular member including the one end 12a, supports the first surface 11a of the light transmissive body 11 at the one end 12a, and vibrates the light transmissive body 11. The retainer 13 includes the side wall 13f including the one end 13a and the other end 13b and surrounding the outer circumference of the light transmissive body 11, and the supporting portion 16 extending inwardly with respect to the side wall 13f from the one end 13a. The retainer 13 is fixed to the vibration body 12 at the portion in contact with the vibration body 12 on the other end 13b side. The supporting portion 16 of the retainer 13 has the supporting surface 16b located on the second surface 11b side of the light transmissive body 11 and configured to support the second surface 11b of the light transmissive body 11.

In this configuration, the vibration device 10 in which reliability of the joint portion 12b between the light transmissive body 11 and the vibration body 12 is improved can be provided. In detail, in the vibration device 10, the light transmissive body 11 is held by being sandwiched between the retainer 13 and the vibration body 12, and thus, separation at the joint portion 12b between the light transmissive body 11 and the vibration body 12 can be reduced or prevented.

Moreover, by the light transmissive body 11 being held while being sandwiched between the retainer 13 and the vibration body 12, the light transmissive body 11 can be held firmly. Therefore, vibration from the piezoelectric material 14 is easily transmitted to the light transmissive body 11 through the vibration body 12, which improves vibration performance of the vibration device 10.

Moreover, since the light transmissive body 11 is held by being sandwiched between the retainer 13 and the vibration body 12, a risk that the light transmissive body 11 falls off from the vibration device 10 can largely be reduced.

Moreover, since a force applied from outside to the vibration device 10 is adsorbed by the retainer 13, a risk of chipping or breaking of the light transmissive body 11 can be reduced. By the outer circumference of the light transmissive body 11 being covered by the retainer 13, the end portion of the light transmissive body 11 which is generally weak can be covered. Therefore, it can be suppressed that the end portion of the light transmissive body 11 is locally applied with a large force, and thus, generation of cracks (for example, chipping) of the light transmissive body 11 can be reduced or prevented. As a result, chipping and breaking of the light transmissive body 11 started from the crack can be reduced or prevented.

The one end 12a of the vibration body 12 and the first surface 11a of the light transmissive body 11 are adhered to each other by the adhesive 20. The supporting surface 16b of the retainer 13 and the second surface 11b of the light transmissive body 11 are adhered to each other by the adhesive 20.

In this configuration, the joint portion between the light transmissive body 11 and the vibration body 12 can be fixed more firmly, and separation can be prevented.

The vibration body 12 includes the first threaded portion 17b on the one end 12a side. The retainer 13 has the second threaded portion 17a formed on the other end 13b side and configured to be threadedly engaged with the first threaded portion 17b.

In this configuration, the retainer 13 and the vibration body 12 can firmly be fixed to each other.

Moreover, although, in the preferred embodiment described above, the example is described in which the vibration body 12 has a cylindrical or substantially cylindrical shape, the shape is not limited to this. For example, the vibration body 12 may have a polygonal tubular shape or an oval tubular shape.

Moreover, although, in the preferred embodiment described above, the example is described in which the retainer 13 has a circular or substantially circular annular shape, the shape is not limited to this. For example, the retainer 13 may have a polygonal annular shape or an oval annular shape.

Moreover, although, in the preferred embodiment described above, the example is described in which the retainer 13 is made of metal, the material forming the retainer 13 is not limited to this. For example, the retainer 13 may be made of plastic.

Moreover, although, in the preferred embodiment described above, the example is described in which the adhesive 20 is applied to the joint portion 12b between the light transmissive body 11 and the vibration body 12, the joint portion 13c between the light transmissive body 11 and the retainer 13, and the joint portion between the first threaded portion 17a and the second threaded portion 17b, it is not limited to this. For example, these joint portions may be joined by plating, coating, brazing, or the like. Further, the adhesive 20 only needs to be applied to at least one of between the one end 12a of the vibration body 12 and the first surface 11a of the light transmissive body 11 or between the supporting surface 16b of the retainer 13 and the second surface 11b of the light transmissive body 11.

Moreover, although, in the preferred embodiment described above, the example is described in which the retainer 13 includes the supporting portion 16, and the one end 12a of the vibration body 12 and the supporting portion 16 hold the light transmissive body 11, it is not limited to this. The light transmissive body 11 only needs to be held by the vibration body 12 and the retainer 13 while being sandwiched therebetween.

Modification

Figure 6:
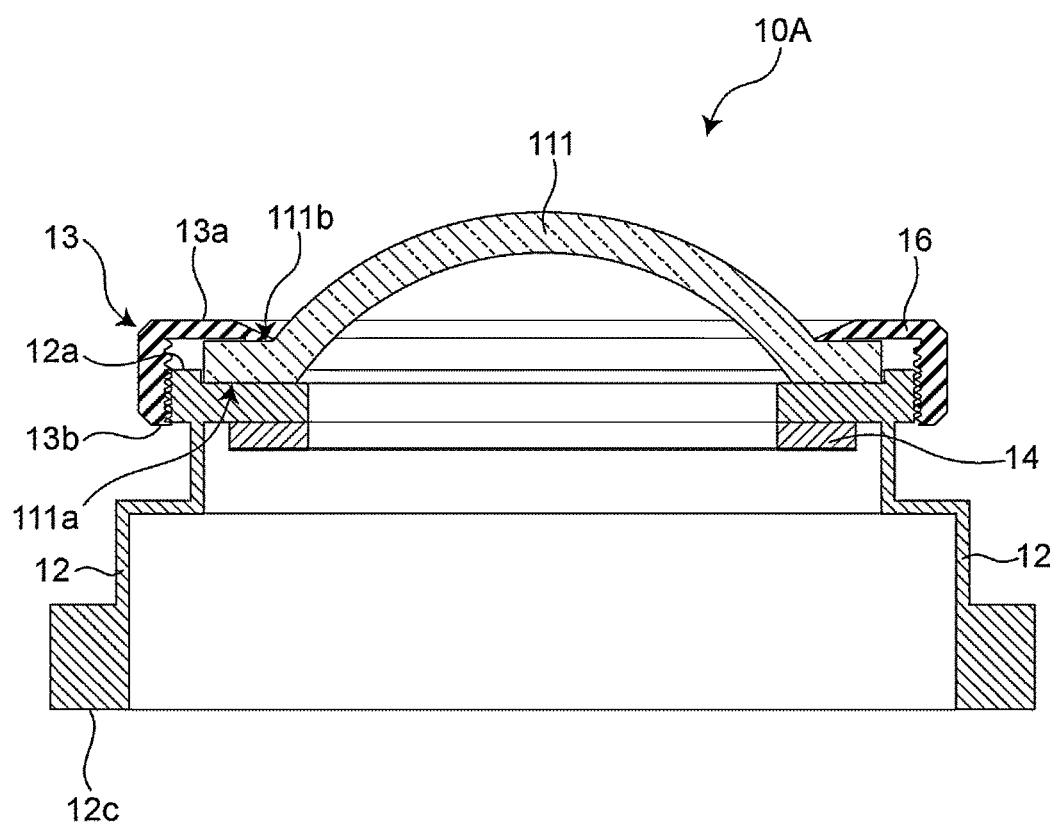
FIG. 6 is a sectional view of a vibration device according to Modification 1 of Preferred Embodiment 1 of the present invention.

FIG. 6 is a sectional view of a vibration device 10A according to Modification 1 of Preferred Embodiment 1. As illustrated in FIG. 6, a light transmissive body 111 may have a dome shape. The dome shape is a shape in which a plate-shaped member is curved hemispherically, for example. In this case, the light transmissive body 111 has, at its end portion, a first surface 111a and a second surface 111b opposed to the first surface 111a.

Alternatively, the light transmissive body may have a plate shape in a polygonal shape (for example, a quadrangular shape, a hexagonal shape, or an octagonal shape), or an oval shape.

Preferred Embodiment 2

A vibration device according to Preferred Embodiment 2 of the present invention is described. Note that, in Preferred Embodiment 2, points different from Preferred Embodiment 1 are mainly described. In Preferred Embodiment 2, the same reference characters are given to the same or equivalent components as or to those of Preferred Embodiment 1. Also, in Preferred Embodiment 2, descriptions overlapping those in Preferred Embodiment 1 are omitted.

Figure 7:
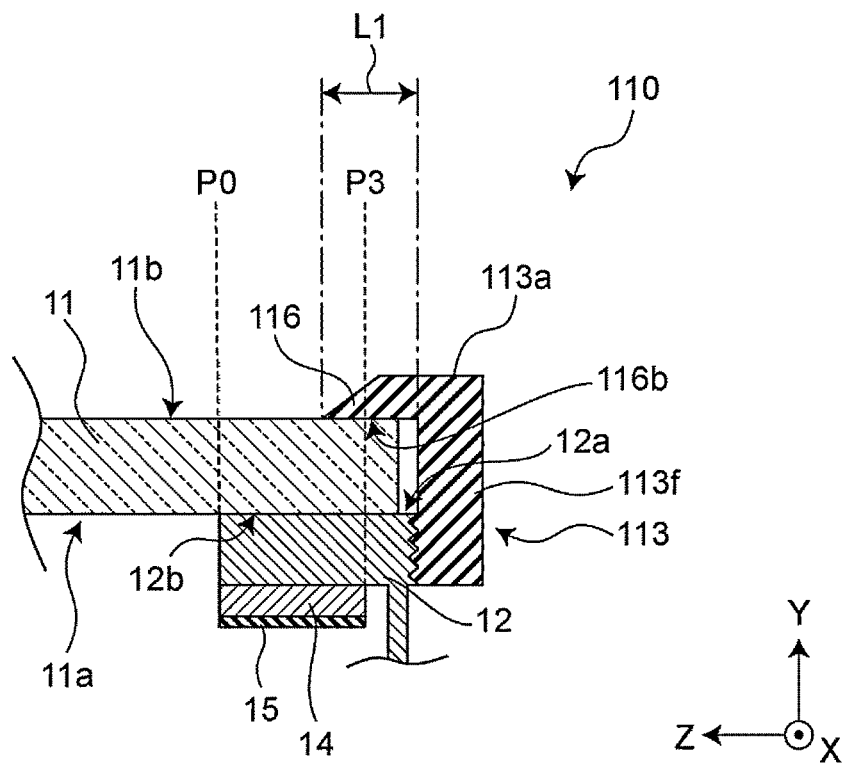
FIG. 7 is a partial sectional view illustrating a vibration device according to Preferred Embodiment 2 of the present invention.

FIG. 7 is a partial sectional view illustrating a vibration device 110 according to Preferred Embodiment 2.

In Preferred Embodiment 2, the shape of a supporting portion 116 of a retainer 113 is different from the shape in Preferred Embodiment 1.

As illustrated in FIG. 7, a length L1 of the supporting portion 116 of the retainer 113 is shorter than the length of the supporting portion 16 of the retainer 13 of the vibration device 10 according to Preferred Embodiment 1. Here, as illustrated in FIG. 7, the length L1 of the supporting portion 116 of the retainer 113 indicates a length in a direction from one end 113a of the retainer 113 to an inner side with respect to a side wall 113f.

As described above, by the length L1 of the supporting portion 116 of the retainer 113 being made shorter, a supporting surface 116b supports the light transmissive body 11 at a portion closer to the outer edge. By the light transmissive body 11 being supported at the portion closer to the outer edge, a field of view during imaging by the imaging part disposed inside can be widened.

Figure 8:
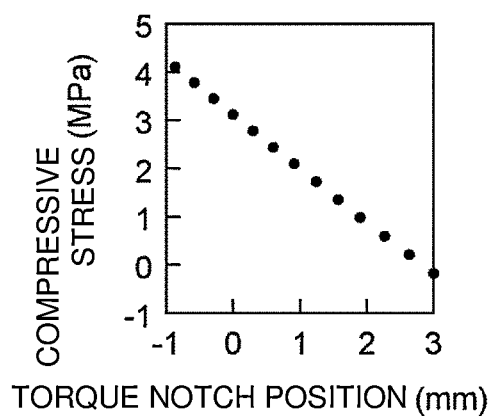
FIG. 8 is a graph illustrating relationship between a position where a supporting portion of a retainer supports the light transmissive body, and compressive stress.

FIG. 8 is a graph illustrating relationship between a position where the supporting surface 116b of the retainer 113 supports the light transmissive body 11 and compressive stress. A torque notch position indicated by a horizontal axis illustrates a position in a direction toward an outer side portion of the light transmissive body 11 by setting a position of a broken line P0 in FIG. 7 as zero. The position of the broken line P0 is the most inner side position of the joint portion 12b between the first surface 11a of the light transmissive body 11 and the one end 12a of the vibration body 12. In this preferred embodiment, a position of a broken line P3 is about 3 mm, for example.

As illustrated in the graph in FIG. 8, as the position where the supporting surface 116b of the retainer 113 supports the second surface 11b of the light transmissive body 11 is a more inner side portion of the light transmissive body 11, compressive stress becomes larger. The compressive stress becoming larger indicates that separation at the joint portion 12b between the light transmissive body 11 and the one end 12a of the vibration body 12 becomes less likely to occur.

On the other hand, when the supporting surface 116b is provided to the outer side portion of the light transmissive body 11, the field of view during imaging by the imaging part can be widened. Therefore, the supporting surface 116b of the retainer 113 may be located outside the position of the broken line P0.

Figure 9:
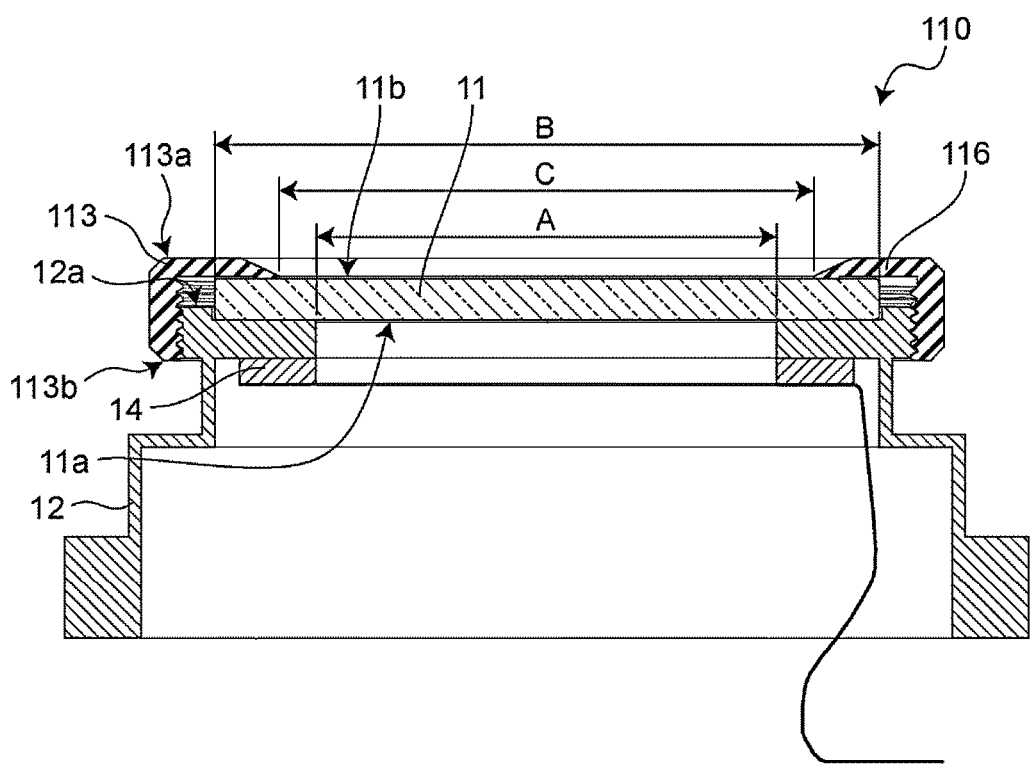
FIG. 9 is a schematic sectional view illustrating an inner diameter of the supporting portion of the retainer, an inner diameter of the vibration body, and an outer diameter of the light transmissive body in the vibration device in FIG. 7.

FIG. 9 is a schematic sectional view illustrating an inner diameter of the supporting portion 116 of the retainer 113, an inner diameter of the vibration body 12, and an outer diameter of the light transmissive body 11 in the vibration device 110 in FIG. 7. In order to achieve both of improving the compressive stress and widening the field of view, an inner diameter C of the supporting portion 116 of the retainer 113 may be equal to or larger than an inner diameter A of the vibration body 12 and smaller than one-half of the sum of the inner diameter A of the vibration body 12 and an outer diameter B of the light transmissive body 11. That is, the length L1 of the supporting portion 116 of the retainer 113 may be determined such that the relationship "A≤C<(A+B)/2" is satisfied.

Effects

By the vibration device 110 according to Preferred Embodiment 2, following effects can be achieved.

The light transmissive body 11 has a circular or substantially circular plate shape. The vibration body 12 and the retainer 113 have a cylindrical or substantially cylindrical shape. The inner diameter C of the supporting portion 116 of the retainer 113 is equal to or larger than the inner diameter A of the vibration body 12 and smaller than one-half of the sum of the inner diameter A of the vibration body 12 and the outer diameter B of the light transmissive body 11.

In this configuration, the field of view of the imaging part can be widened while reliability of the joint portion is improved. The reliability of the joint portion means unlikeliness of separation and high strength at the joint portion 12b between the light transmissive body 11 and the vibration body 12. In the preferred embodiment described above, since the light transmissive body 11 can firmly be held by the retainer 113 and the vibration body 12, reliability of the joint portion can be improved, that is, the occurrence of separation can be reduced, and the strength of the joint portion can be improved. Further, compared to the vibration device 10 in Preferred Embodiment 1, the supporting surface 116b of the retainer 113 is provided to the more outer side portion of the light transmissive body 11. Therefore, the field of view during imaging can be widened.

Preferred Embodiment 3

A vibration device according to Preferred Embodiment 3 of the present invention is described. Note that, in Preferred Embodiment 3, points different from Preferred Embodiment 2 are mainly described. In Preferred Embodiment 2, the same reference characters are given to the same or equivalent components as or to those of Preferred Embodiment 2. Also, in Preferred Embodiment 3, descriptions overlapping those in Preferred Embodiment 2 are omitted.

Figure 10:
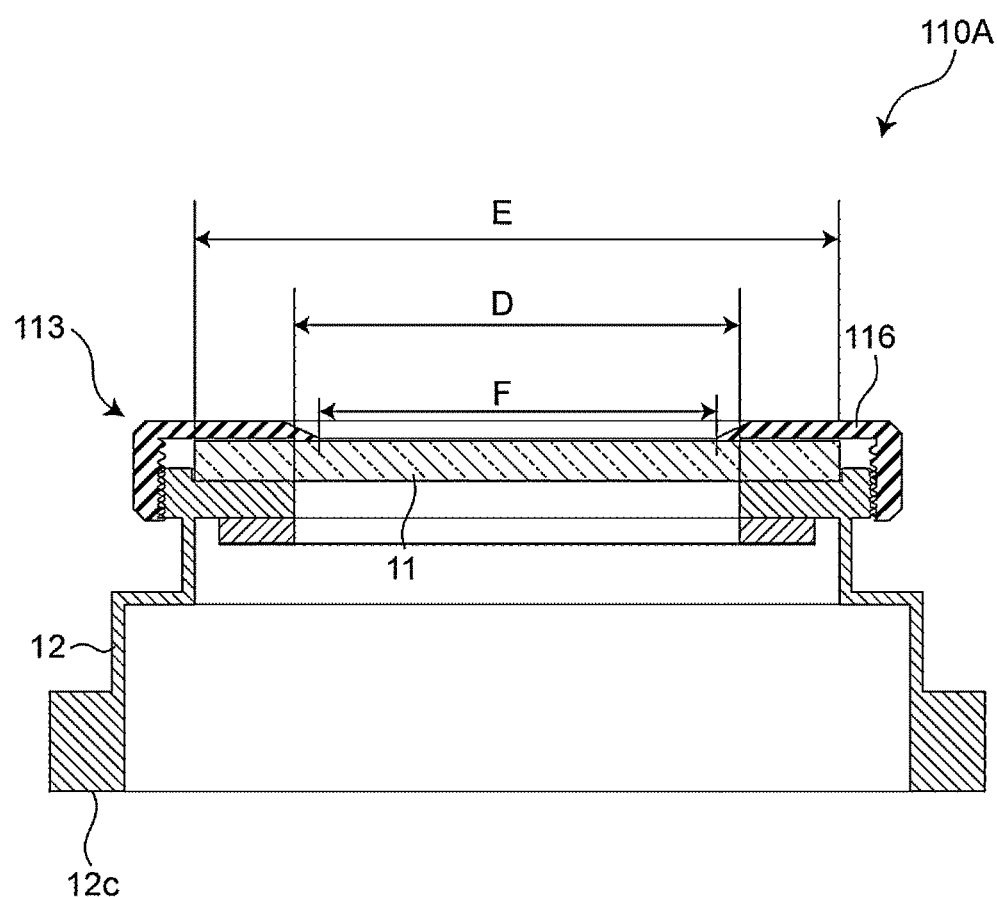
FIG. 10 is a sectional view of a vibration device according to Preferred Embodiment 3 of the present invention.

FIG. 10 is a sectional view of a vibration device 110A according to Preferred Embodiment 3.

As illustrated in FIG. 10, Preferred Embodiment 3 is different from Preferred Embodiment 2 in that an inner diameter F of the supporting portion 116 of the retainer 113 is smaller than an inner diameter D of the vibration body 12. In this case, the inner diameter F of the supporting portion 116 of the retainer 113 may be smaller than about one-half of the sum of the inner diameter D of the vibration body 12 and an outer diameter E of the light transmissive body 11.

In this case, since a contact area between the retainer 113 and the light transmissive body 11 increases, the light transmissive body 11 can be fixed more firmly.

Preferred Embodiment 4

A vibration device according to Preferred Embodiment 4 of the present invention is described. Note that, in Preferred Embodiment 4, points different from Preferred Embodiment 1 are mainly described. In Preferred Embodiment 4, the same reference characters are given to the same or equivalent components as or to those of Preferred Embodiment 1. Also, in Preferred Embodiment 4, descriptions overlapping those in Preferred Embodiment 1 are omitted.

Figure 11:
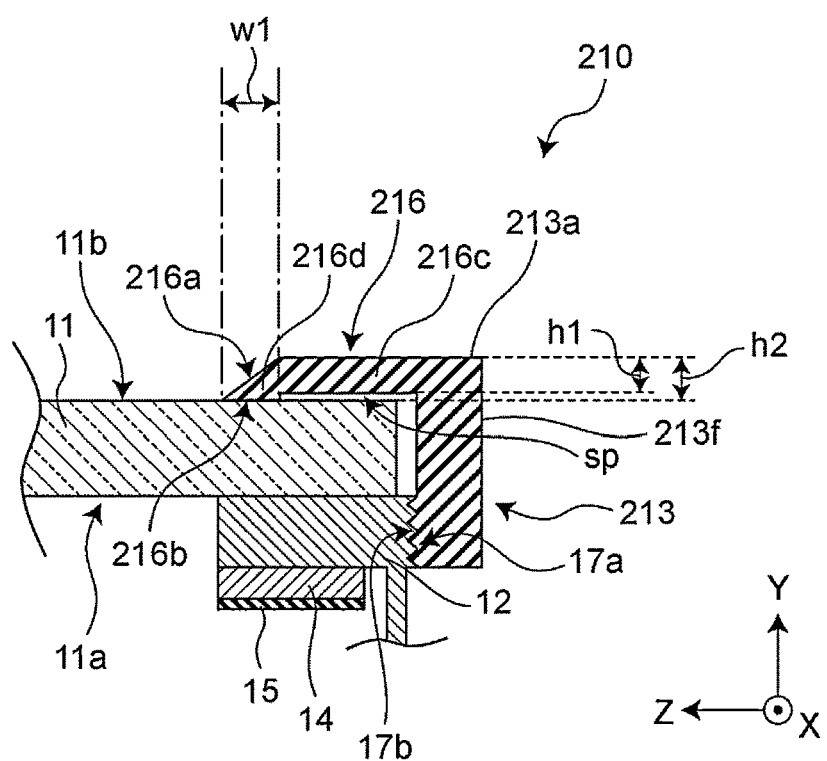
FIG. 11 is a partial sectional view of a vibration device according to Preferred Embodiment 4 of the present invention.

FIG. 11 is a partial sectional view of a vibration device 210 according to Preferred Embodiment 4.

Preferred Embodiment 4 is different from Preferred Embodiment 1 in that a supporting portion 216 of a retainer 213 includes a first supporting portion 216c and a second supporting portion 216d.

The first supporting portion 216c extends inwardly with respect to a side wall 213f from one end 213a of the retainer 213. A space sp is formed between the first supporting portion 216c and the second surface 11b of the light transmissive body 11.

The second supporting portion 216d projects toward the second surface 11b of the light transmissive body 11 from a tip end of the first supporting portion 216c, and has a supporting surface 216b.

The space sp between the first supporting portion 216c and the second surface 11b of the light transmissive body 11 may be formed by, for example, a recess being provided to the supporting surface 16b of the supporting portion 16 of the retainer 13 described in Preferred Embodiment 1 (FIG. 2B). Alternatively, the space sp may be formed by the first supporting portion 216c being formed such that a thickness h1 of the first supporting portion 216c of the retainer 213 is smaller than a thickness h2 of the second supporting portion 216d. Note that, in this preferred embodiment, the thickness h1 of the first supporting portion 216c is about 0.7 mm, and the thickness h2 of the second supporting portion 216d is about 0.8 mm, for example.

A width w1 of the second supporting portion 216d of the retainer 213 in a direction in which the supporting portion 216 extends (that is, the width w1 of the supporting surface 216b) may be about 0.3 times or larger and about 3 times or smaller the thickness h1 of the first supporting portion 216c, for example. That is, the width w1 of the supporting surface 216b of the retainer 213 may be about 0.3 times or larger and about 3 times or smaller the thickness h1 of the first supporting portion 216c, for example. In this preferred embodiment, the thickness h1 of the first supporting portion 216c is about 0.7 mm, and the width w1 of the second supporting portion 216d is about 1 mm, for example.

By the supporting portion 216 of the retainer 213 being formed in this manner, the supporting surface 216b provided to the second supporting portion 216d can support the light transmissive body 11 at the more inner side portion.

Effects

By the vibration device 210 according to Preferred Embodiment 4, following effects can be achieved.

The supporting portion 216 of the retainer 213 includes the first supporting portion 216c and the second supporting portion 216d. The first supporting portion 216c extends inwardly with respect to the side wall 213f from the one end 213a of the retainer 213. The second supporting portion 216d projects toward the second surface 11b of the light transmissive body 11 from the tip end of the first supporting portion 216c, and has the supporting surface 216b. The space is formed between the first supporting portion 216c and the second surface 11b of the light transmissive body 11. The width w1 of the second supporting portion 216d of the retainer 213 in the extending direction of the supporting portion 216 is about 0.3 times or larger and about 3 times or smaller the thickness h1 of the first supporting portion 216c, for example.

In this configuration, the vibration device 210 with higher reliability can be provided. The separation between the light transmissive body 11 and the vibration body 12 occurs from the inner side portion of the light transmissive body 11 where amplitude is large. However, by the second supporting portion 216d of the supporting portion 216 supporting the second surface 11b of the light transmissive body 11, the more inner side portion of the light transmissive body 11 can be fixed.

In the vibration device 10 in Preferred Embodiment 1, the outer edge portion of the second surface 1ib of the light transmissive body 11 is supported by the substantially entire supporting portion 16 of the retainer 13. On the other hand, in this preferred embodiment, the outer edge portion of the second surface 11b of the light transmissive body 11 is supported by the second supporting portion 216d of the retainer 213. Therefore, a contact area between the supporting surface 216b provided to the second supporting portion 216d of the retainer 213 and the second surface 11b of the light transmissive body 11 in Preferred Embodiment 4 becomes smaller than the contact area between the supporting surface 16b of the retainer 13 and the second surface 11b of the light transmissive body 11 in Preferred Embodiment 1. The smaller the contact area is, the larger the force applied to the contact portion becomes. In Preferred Embodiment 4, since the second supporting portion 216d is formed at the tip end of the first supporting portion 216c, the supporting surface 216b supports the light transmissive body 11 at the more inner side portion compared to Preferred Embodiment 1. Therefore, in the case of the supporting surface 216b of the vibration device 210 in this preferred embodiment, the force pressing the light transmissive body 11 is applied to the more inner side portion of the light transmissive body 11 compared to Preferred Embodiment 1. By the more inner side portion being fixed, separation between the light transmissive body 11 and the vibration body 12 is reduced, and reliability of the joint portion can be improved.

Preferred Embodiment 5

A vibration device according to Preferred Embodiment 5 of the present invention is described. Note that, in Preferred Embodiment 5, points different from Preferred Embodiment 1 are mainly described. In Preferred Embodiment 5, the same reference characters are given to the same or equivalent components as or to those of Preferred Embodiment 1. Also, in Preferred Embodiment 5, descriptions overlapping those in Preferred Embodiment 1 are omitted.

Figure 12:
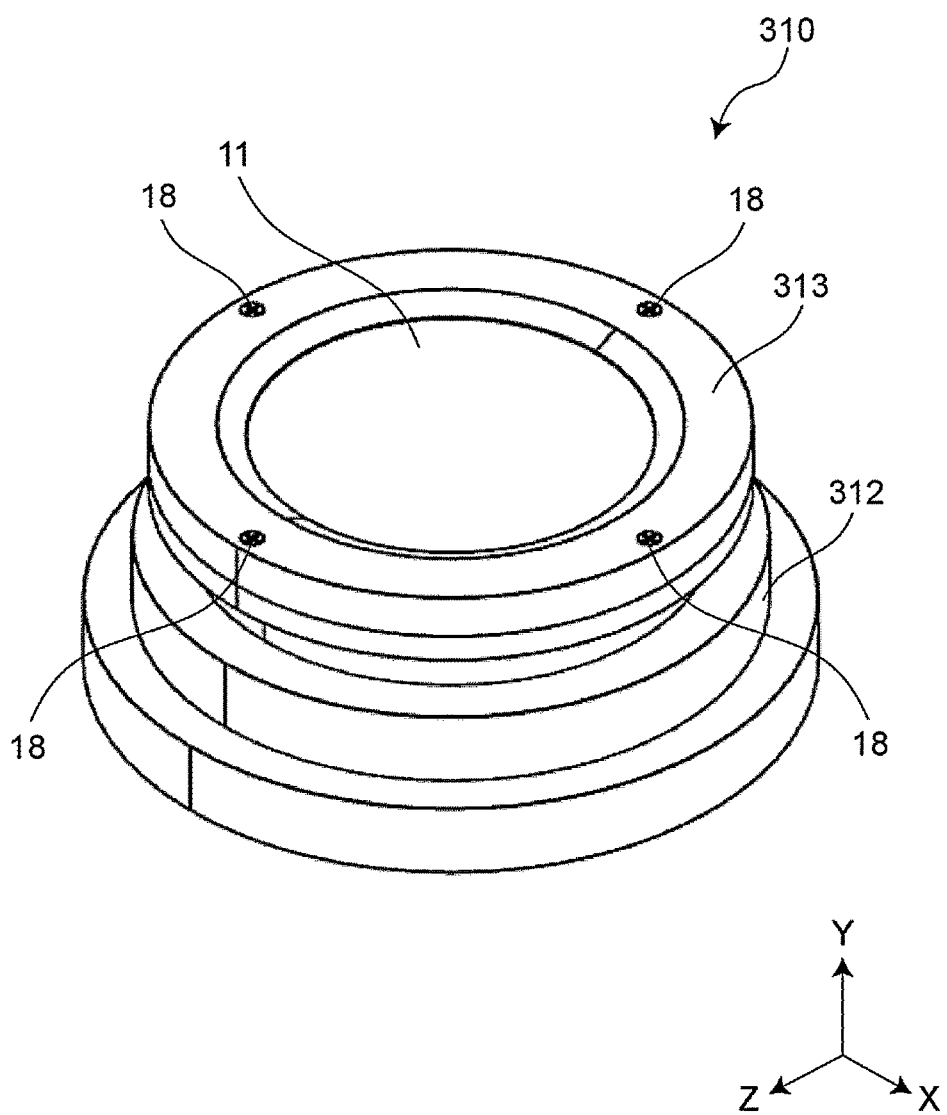
FIG. 12 is a perspective view illustrating a vibration device according to Preferred Embodiment 5 of the present invention.
Figure 13:
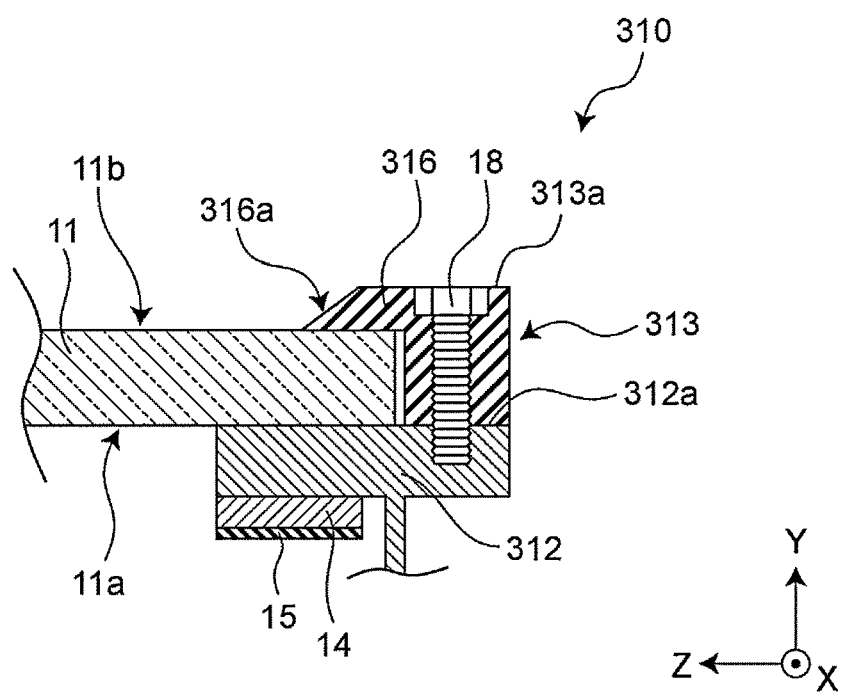
FIG. 13 is a partial sectional view illustrating the vibration device in FIG. 12.
Figure 14:
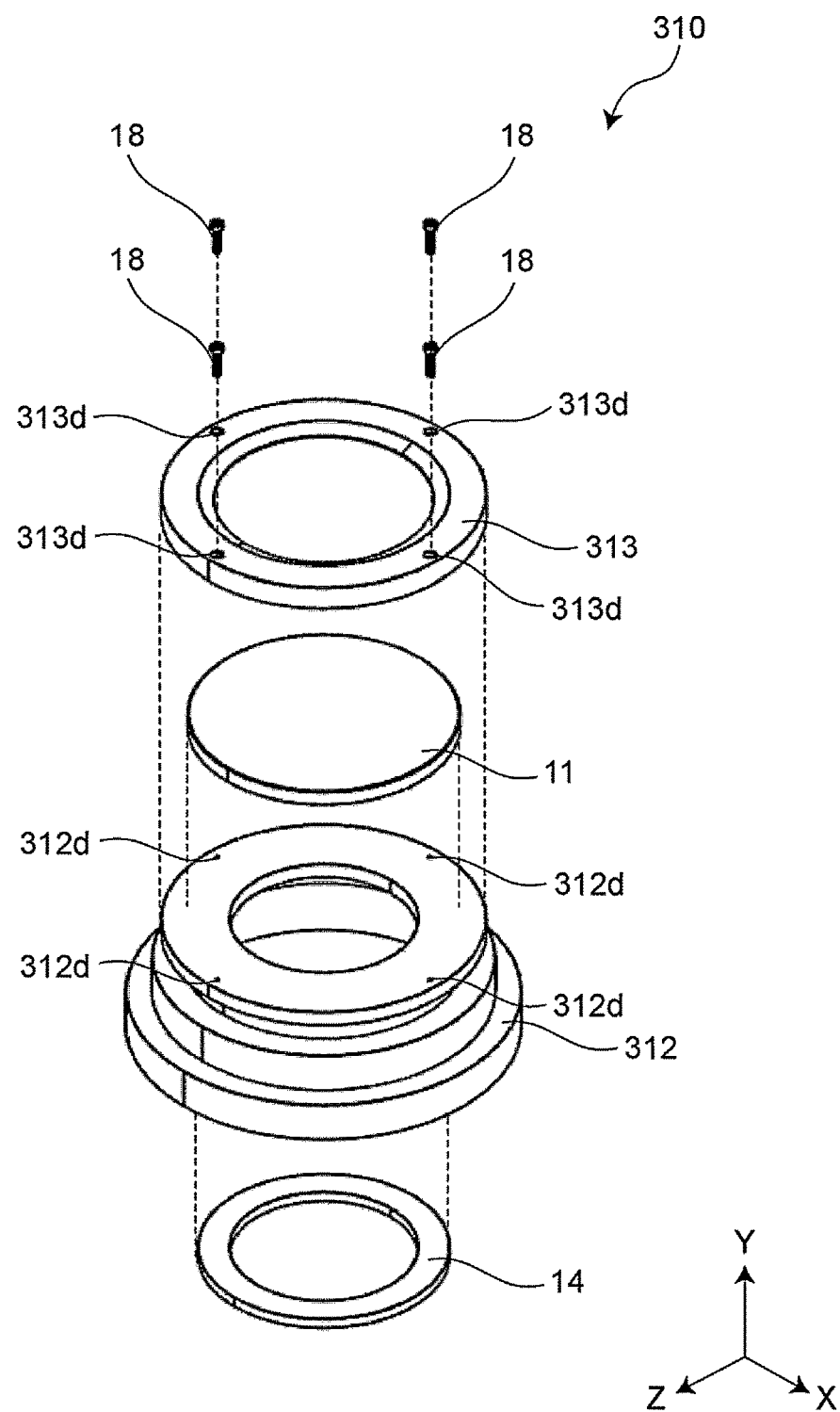
FIG. 14 is an exploded perspective view illustrating the vibration device in FIG. 12.

FIG. 12 is a perspective view illustrating a vibration device 310 according to Preferred Embodiment 5. FIG. 13 is a partial sectional view illustrating the vibration device 310 in FIG. 12. FIG. 14 is an exploded perspective view illustrating the vibration device 310 in FIG. 12.

Preferred Embodiment 5 is different from Preferred Embodiment 1 in that a retainer 313 and a vibration body 312 are fixed to each other by a plurality of screws 18.

As illustrated in FIGS. 12 to 14, in the vibration device 310, the retainer 313 and the vibration body 312 are fixed to each other by four screws 18 instead of by the first threaded portion and the second threaded portion. Four through-holes 313d are provided from an end surface of the retainer 313 on a side of one end 313a to the other end. Four threaded-holes 312d are also provided to an end surface of the vibration body 312 on a side of the one end 312a.

In this preferred embodiment, the four screws 18 are disposed at an equal interval. By the four screws being disposed at an equal interval, the retainer 313 and the vibration body 312 can stably be fixed to each other. Therefore, the light transmissive body 11 can firmly be fixed while being sandwiched between the supporting portion 316 of the retainer 313 and the vibration body 12.

Effects

By the vibration device 310 according to Preferred Embodiment 5, following effects can be achieved.

The retainer 313 and the vibration body 312 are fixed to each other by the plurality of screws 18.

In this configuration, the retainer 313 and the vibration body 312 can be fixed to each other at lower cost than the first threaded portion and the second threaded portion respectively being formed in the retainer 313 and the vibration body 312.

Note that, although, in Preferred Embodiment 5, the example is described in which the retainer 313 and the vibration body 312 are fixed to each other by the four screws 18, the number of screws is not limited to four as long as the number of screws is two or more. In this case, the screws may be disposed at an equal interval.

Moreover, the vibration body 312 may have four through-holes instead of the four threaded-holes 312d. In this case, the retainer 313 and the vibration body 312 may be fixed to each other by a bolt being inserted into the through-holes of the retainer 313 and the vibration body 312, and fastened by a nut.

Preferred Embodiment 6

A vibration device according to Preferred Embodiment 6 of the present invention is described. Note that, in Preferred Embodiment 6, points different from Preferred Embodiment 1 are mainly described. In Preferred Embodiment 6, the same reference characters are given to the same or equivalent components as or to those of Preferred Embodiment 1. Also, in Preferred Embodiment 6, descriptions overlapping those in Preferred Embodiment 1 are omitted.

Figure 15:
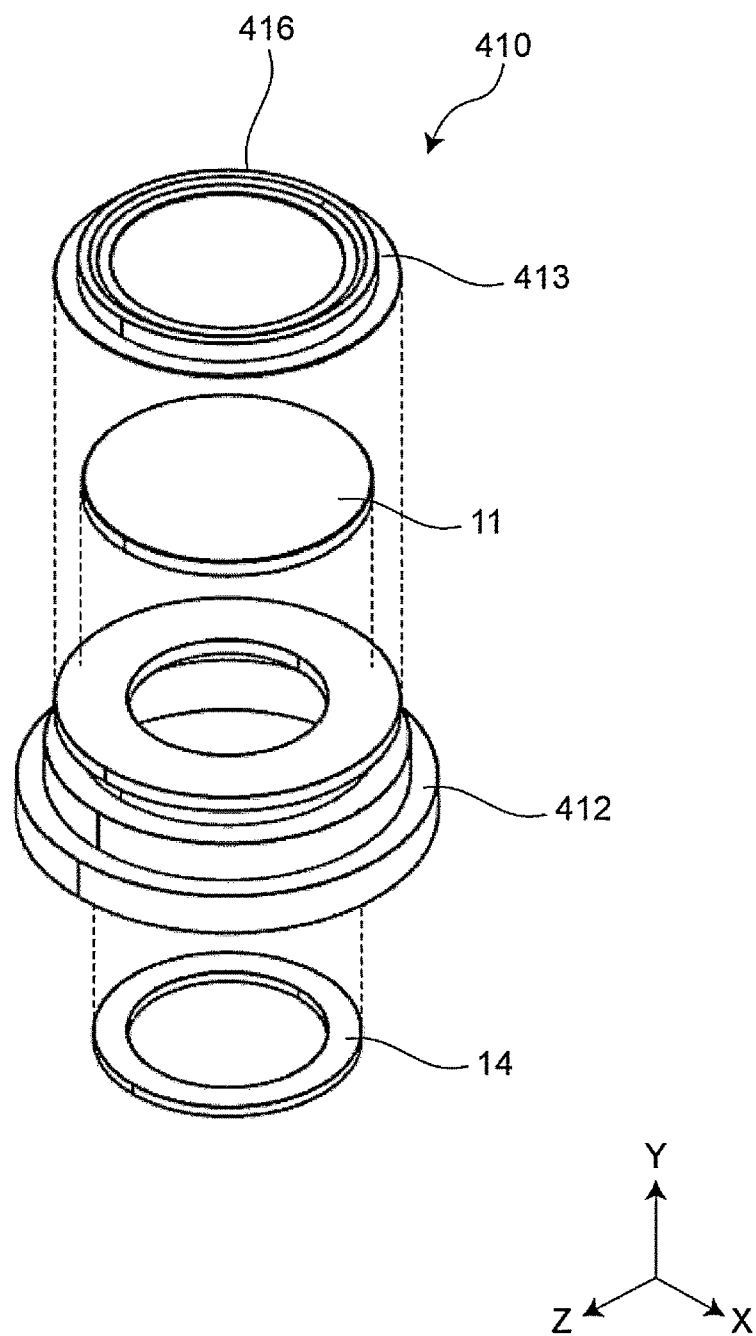
FIG. 15 is an exploded perspective view illustrating a vibration device according to Preferred Embodiment 6 of the present invention.
Figure 16:
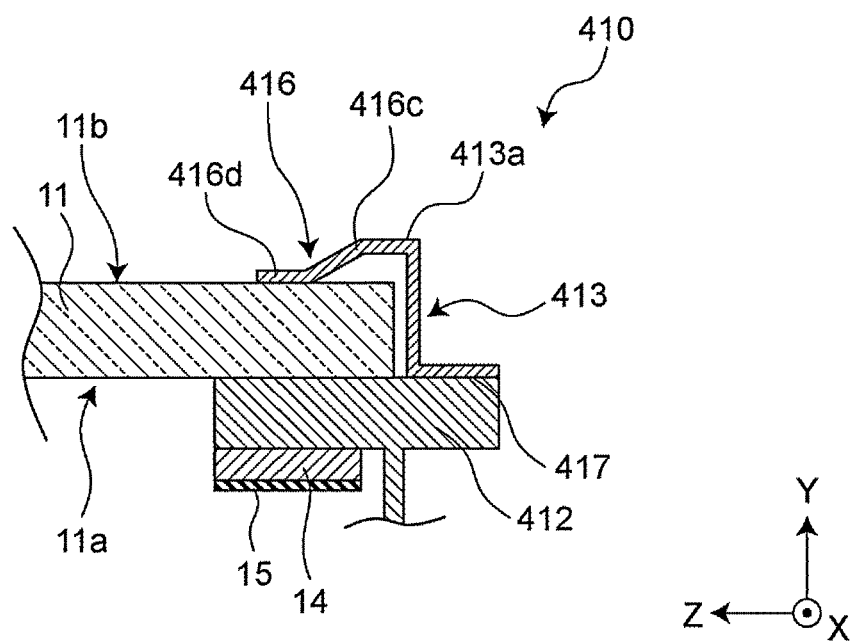
FIG. 16 is a partial sectional view of the vibration device in FIG. 15.

FIG. 15 is an exploded perspective view illustrating a vibration device 410 according to Preferred Embodiment 6. FIG. 16 is a partial sectional view of the vibration device 410 in FIG. 15.

Preferred Embodiment 6 is different from Preferred Embodiment 1 in that a supporting portion 416 of a retainer 413 is a plate spring.

As illustrated in FIGS. 15 and 16, the supporting portion 416 of the retainer 413 is a plate spring. In this preferred embodiment, as illustrated in FIG. 15, the supporting portion 416 of the retainer 413 includes an annular plate spring.

As illustrated in FIG. 16, the retainer 413 is formed by a member in a plate shape, and the supporting portion 416 of the retainer 413 is formed to be curved inwardly at one end 413a of the retainer 413. In detail, the supporting portion 416 includes a spring portion 416c curved inwardly at the one end 413a of the retainer 413, and a pressing surface 416d supporting the second surface 11b of the light transmissive body 11. Being curved inwardly means to be curved toward the second surface 11b of the light transmissive body 11 from the one end 413a of the retainer 413.

The supporting portion 416 presses the second surface 11b of the light transmissive body 11 by restoring force of the plate spring. Further, the supporting portion 416 and the second surface 11b of the light transmissive body 11 may be adhered to each other by adhesive.

A joint portion 417 between the retainer 413 and a vibration body 412 is fixed by welding, adhesive, or the like.

Effects

By the vibration device 410 according to Preferred Embodiment 6, following effects can be achieved.

The supporting portion 416 of the retainer 413 is one or a plurality of plate springs.

In this configuration, manufacturing cost of the retainer 413 can be reduced.

Note that, although, in Preferred Embodiment 6, the example is described in which the supporting portion 416 is an annular plate spring, the shape of the supporting portion 416 is not limited to this. For example, the supporting portion 416 may include a plurality of plate springs. In this case, the plate springs may be disposed at an equal interval.

Preferred Embodiment 7

A vibration device according to Preferred Embodiment 7 of the present invention is described. Note that, in Preferred Embodiment 7, points different from Preferred Embodiment 4 are mainly described. In Preferred Embodiment 7, the same reference characters are given to the same or equivalent components as or to those of Preferred Embodiment 4. Also, in Preferred Embodiment 7, descriptions overlapping those in Preferred Embodiment 4 are omitted.

Figure 17:
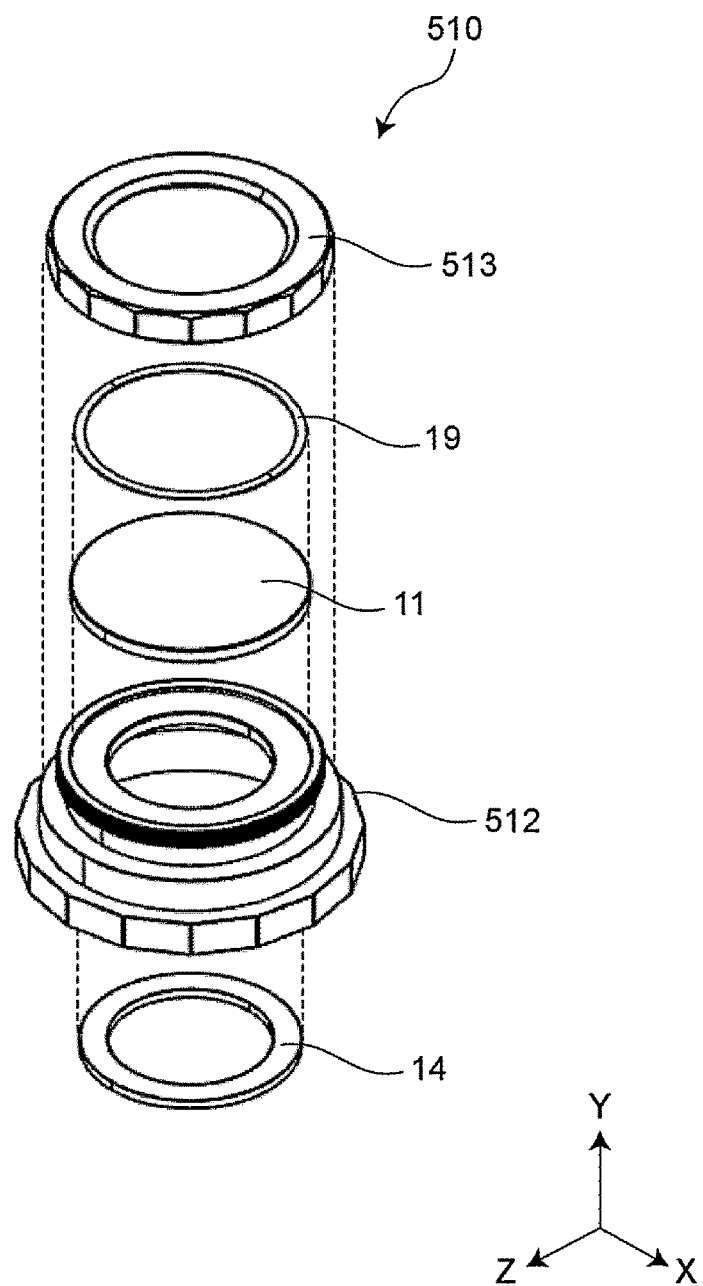
FIG. 17 is an exploded perspective view illustrating a vibration device according to Preferred Embodiment 7 of the present invention.
Figure 18:
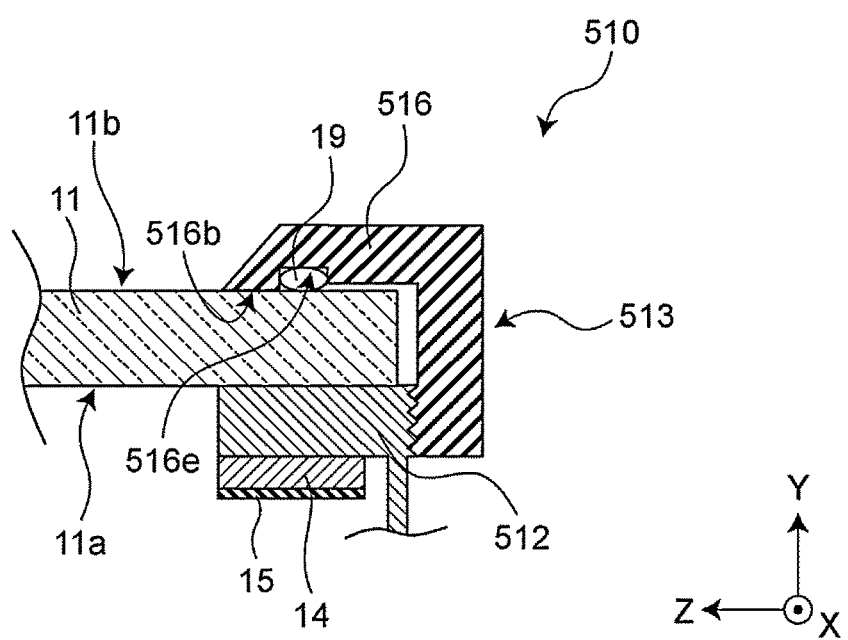
FIG. 18 is a partial sectional view of the vibration device in FIG. 17.

FIG. 17 is an exploded perspective view illustrating a vibration device 510 according to Preferred Embodiment 7. FIG. 18 is a partial sectional view of the vibration device 510 in FIG. 17.

Preferred Embodiment 7 is different from Preferred Embodiment 1 in that a groove 516e is formed in a supporting portion 516 of a retainer 513, and a sealing member 19 is provided to the groove 516e.

As illustrated in FIG. 17, the sealing member 19 is disposed between the retainer 513 and the second surface 11b of the light transmissive body 11. By the sealing member 19 being provided, waterproofing can be achieved between the retainer 513 and the second surface 11b of the light transmissive body 11, and entering of foreign matters, such as a water droplet or the like, into the vibration device 510 can be prevented.

As illustrated in FIG. 18, the groove 516e is formed in a surface 516b of the supporting portion 516 of the retainer 513, the surface 516b being opposed to the second surface 11b of the light transmissive body 11. The groove 516e is formed in an annular shape and is continuous along an inner circumference of the retainer 513. Although, in this preferred embodiment, the groove 516e is formed in a circular annular shape, it may be formed in a polygonal shape or an oval shape, for example.

The sealing member 19 is an elastic member such as an O ring, for example. The sealing member 19 may be any member as long as it can achieve waterproofing between the retainer 513 and the second surface 11b of the light transmissive body 11.

Effects

By the vibration device 510 according to Preferred Embodiment 7, following effects can be achieved.

The groove 516e is formed to be continuous along the inner circumference of the retainer 513 on the surface 516b of the supporting portion 516 of the retainer 513, the surface 516b being opposed to the second surface 11b of the light transmissive body 11. The sealing member 19 is provided to the groove 516e.

As the sealing member 19, an O ring made of rubber can be used, for example. O rings are generally higher in waterproof performance than adhesive, and particularly, also in a high-temperature and high-humidity environment at a temperature of about 85° C. and a humidity of about 85%, for example, entering of water vapor can be suppressed. Therefore, by the sealing member 19 being provided between the supporting portion 516 of the retainer 513 and the second surface 11b of the light transmissive body 11, moisture-resistance reliability of the vibration device 510 can be improved.

Preferred Embodiment 8

A vibration device according to Preferred Embodiment 8 of the present invention is described. Note that, in Preferred Embodiment 8, points different from Preferred Embodiment 1 are mainly described. In Preferred Embodiment 8, the same reference characters are given to the same or equivalent components as or to those of Preferred Embodiment 1. Also, in Preferred Embodiment 8, descriptions overlapping those in Preferred Embodiment 1 are omitted.

Figure 19:
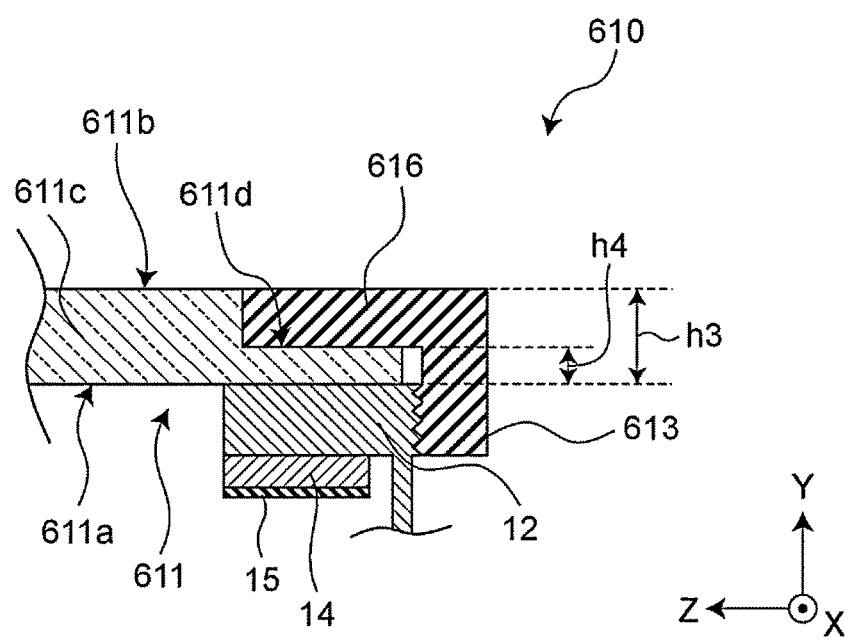
FIG. 19 is a partial sectional view illustrating a vibration device according to Preferred Embodiment 8 of the present invention.

FIG. 19 is a partial sectional view illustrating a vibration device 610 according to Preferred Embodiment 8.

Preferred Embodiment 8 is different from Preferred Embodiment 1 in that a light transmissive body 611 includes a body portion 611c and a frame portion 611d.

As illustrated in FIG. 19, the light transmissive body 611 includes the body portion 611c, and the frame portion 611d provided to an outer edge of the body portion 611c and having a thickness h4 smaller than a thickness h3 of the body portion 611c.

A supporting portion 616 of a retainer 613 supports the frame portion 611d. That is, the supporting portion 616 of the retainer 613 is provided to the frame portion 611d having the smaller thickness. The frame portion 611d of the light transmissive body 611 has a surface formed at a position lower than a second surface 611b of the body portion 611c in the Y direction. The body portion 611c and the frame portion 611d are formed integrally. By the supporting portion 616 of the retainer 613 being provided to the frame portion 611d, the second surface 611b of the light transmissive body 611 and an upper surface of the retainer 613 become flat.

The thickness h4 of the frame portion 611d may be one-tenth or larger and nine-tenth or smaller of the thickness h3 of the body portion 611c. By the thickness h4 of the frame portion 611d being made in this range, strength of the frame portion 611d is maintained, and damage of the light transmissive body 611 can be prevented. Further, the field of view during imaging by the imaging part can be widened.

Effects

By the vibration device 610 according to Preferred Embodiment 8, following effects can be achieved.

The light transmissive body 611 includes the body portion 611c and the frame portion 611d. The frame portion 611d is provided to the outer edge of the body portion 611c, and has the thickness h4 smaller than the thickness h3 of the body portion 611c.

In this configuration, when the retainer 613 and the vibration body 12 are fixed to each other, the second surface 611b of the body portion 611c of the light transmissive body 11 and the upper surface of the supporting portion 616 of the retainer 613 become flat. Therefore, foreign matters, such as a water droplet or the like, adhering to the light transmissive body 11 easily flow out. Further, the field of view during imaging by the imaging part can be widened. Note that it is not always necessary that the second surface 611b of the light transmissive body 11 and the upper surface of the retainer 613 are flat. The effect to avoid impedance of the field of view can sufficiently be achieved as long as the upper surface of the retainer 613 does not excessively project with respect to the second surface lib of the light transmissive body 611.

Examples

Values of compressive stress applied to the vibration device are calculated through simulation using the vibration device 10 of Preferred Embodiment 1 as Example 2 and the vibration device 210 of Preferred Embodiment 4 as Example 3. Moreover, as Reference Example 2, compressive stress is measured similarly to Example 2 and Example 3, using a vibration device provided with a retainer without a supporting portion.

In the simulation, piezoelectric analysis and stress analysis are performed using Femtet® which is analysis software manufactured by Murata Software Co., Ltd.

Figure 20A:
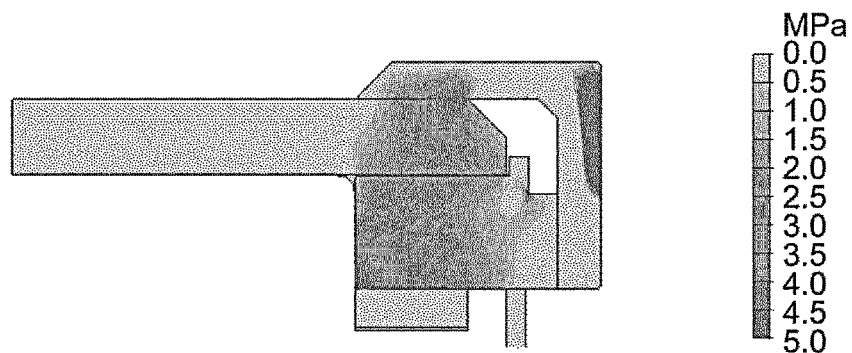
FIG. 20A is a diagram illustrating distribution of compressive stress of a vibration device of Example 2.
Figure 20B:
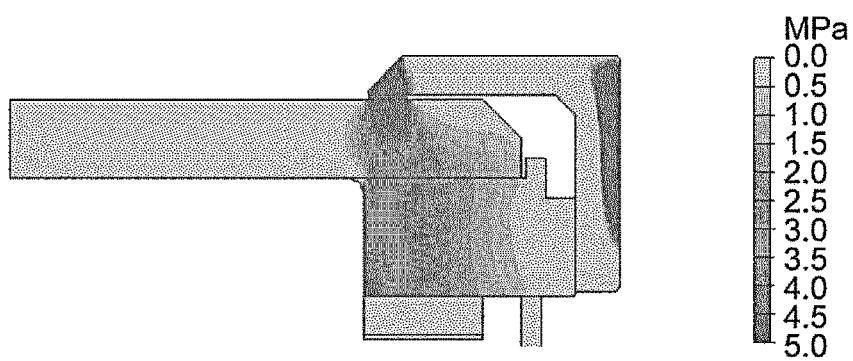
FIG. 20B is a diagram illustrating distribution of compressive stress of a vibration device of Example 3.
Figure 20C:
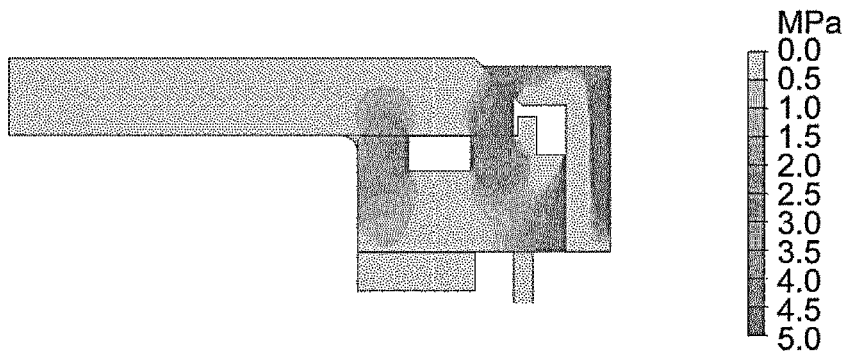
FIG. 20C is a diagram illustrating distribution of compressive stress of a vibration device of Reference Example 2.

FIG. 20A is a diagram illustrating distribution of compressive stress of the vibration device 10 of Example 2. FIG. 20B is a diagram illustrating distribution of compressive stress of the vibration device 210 of Example 3. FIG. 20C is a diagram illustrating distribution of compressive stress of a vibration device of Reference Example 2. In FIGS. 20A to 20C, a light-color part indicates a smaller compressive stress, and a dark-color part indicates a larger compressive stress.

Vibration Device of Example 2

Configuration of the vibration device 10 of Example 2 is described in Preferred Embodiment 1, and thus description thereof is omitted.

Vibration Device of Example 3

Configuration of the vibration device 210 of Example 3 is described in Preferred Embodiment 4, and thus description thereof is omitted.

Vibration Device of Reference Example 2

The vibration device of Reference Example 2 includes a light transmissive body having a slope surface at an outer edge portion thereof, and a retainer which supports the slope surface of the light transmissive body. Other configurations are the same as the vibration device 10 of Example 2.

Comparison Result of Compressive Stress

Based on the simulation result of the vibration device 10 of Example 2 illustrated in FIG. 20A, the compressive stress concentrates on the first surface 11a of the light transmissive body 11. In this case, the compressive stress at the joint portion between the light transmissive body 11 and the vibration body 12 is 2.89 MPa.

Based on the simulation result of the vibration device 210 of Example 3 illustrated in FIG. 20B, similarly to Example 2, the compressive stress concentrates on the first surface 11a of the light transmissive body 11. In this case, the compressive stress at the joint portion between the light transmissive body 11 and the vibration body 12 is 3.18 MPa. In Example 3, the second supporting portion 216d of the retainer 213 supports the more inner side portion of the light transmissive body 11 compared to Example 2. Therefore, the light transmissive body 11 is firmly fixed at the more inner side portion compared to Example 2. Thus, in the vibration device 210 of Example 3, the compressive stress at the joint portion is larger than in Example 2.

Based on the simulation result of the vibration device of Reference Example 2 illustrated in FIG. 20C, the compressive stress at the first surface of the light transmissive body is smaller than in Example 2 and Example 3. Therefore, in the vibration device of Reference Example 2, separation is likely to occur at the joint portion between the light transmissive body and the vibration body. In this case, the compressive stress at the joint portion between the light transmissive body and the vibration body is 0.86 MPa.

Based on the results described above, it is clear that the compressive stress at the joint portion between the light transmissive body and the vibration body becomes higher when the retainer supports the upper surface (second surface) of the light transmissive body than when the retainer supports the side surface (slope surface) of the light transmissive body. As the compressive stress increases, occurrence of the separation at the joint portion between the light transmissive body and the vibration body can be suppressed, which improves reliability of the vibration device.

Moreover, when comparing the results of Example 2 and Example 3, the compressive stress at the joint portion between the light transmissive body and the vibration body is higher in the vibration device 210 of Example 3. The separation at the joint portion between the light transmissive body and the vibration body is likely to occur from the inner side portion of the light transmissive body where amplitude is large. Therefore, by the second supporting portion being provided like in Example 3, the more inner side portion of the light transmissive body can be supported. Thus, reliability of the vibration device can be improved more in the configuration of Example 3.

Note that the present disclosure includes combination of arbitrary preferred embodiments and/or examples among the various embodiments and/or examples described above, and can achieve the effect of each preferred embodiment and/or example.

The vibration devices and the imaging devices according to various preferred embodiments of the present invention and modifications and combinations thereof are applicable to car-mounted cameras, surveillance cameras, or optical sensors such as LiDAR, which are used outdoors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:
a tubular vibration body;
a retainer fixed to the vibration body; and
a light transmissive body to be vibrated by the vibration body and held between the vibration body and the retainer; wherein
the light transmissive body includes a first surface and a second surface opposed to the first surface;
the vibration body includes one end and supports the first surface of the light transmissive body at the one end;
the vibration body includes an outer surface opposed to the one end; and
the outer surface of the vibration body is not in contact with the retainer.

2. The vibration device according to claim 1, wherein the retainer includes:
a side wall including a first end and a second end and surrounding an outer circumference of the light transmissive body; and
a supporting portion extending inwardly with respect to the side wall from the first end of the side wall;
the retainer is fixed to the vibration body at a portion in contact with the vibration body on a side of the second end; and
the supporting portion includes a supporting surface on a side of the second surface of the light transmissive body to support the second surface of the light transmissive body.

3. The vibration device according to claim 2, wherein at least one of adhesion between the one end of the vibration body and the first surface of the light transmissive body or adhesion between the supporting surface of the retainer and the second surface of the light transmissive body is provided by adhesive.

4. The vibration device according to claim 2, wherein the supporting portion of the retainer includes:
a first supporting portion extending inwardly with respect to the side wall from the one end of the retainer; and
a second supporting portion projecting toward the second surface of the light transmissive body from a tip end of the first supporting portion and including the supporting surface; and
a space is provided between the first supporting portion and the second surface of the light transmissive body.

5. The vibration device according to claim 4, wherein a width of the second supporting portion of the retainer in a direction in which the supporting portion extends is about 0.3 times or larger and about 3 times or smaller a thickness of the first supporting portion.

6. The vibration device according to claim 2, wherein the light transmissive body has a circular or substantially circular plate shape;
the vibration body and the retainer have a cylindrical or substantially cylindrical shape; and
an inner diameter of the supporting portion of the retainer is equal to or larger than an inner diameter of the vibration body and smaller than about one-half of a sum of the inner diameter of the vibration body and an outer diameter of the light transmissive body.

7. The vibration device according to claim 2, wherein the light transmissive body has a circular or substantially circular plate shape;
the vibration body and the retainer have a cylindrical or substantially cylindrical shape; and
an inner diameter of the supporting portion of the retainer is smaller than an inner diameter of the vibration body and smaller than about one-half of a sum of the inner diameter of the vibration body and an outer diameter of the light transmissive body.

8. The vibration device according to claim 2, wherein the retainer includes a second threaded portion on the side of the second end; and
the vibration body includes a first threaded portion on a side of the one end of the vibration body to be threadedly engaged with the second threaded portion.

9. The vibration device according to claim 2, wherein the retainer and the vibration body are fixed to each other by a plurality of screws.

10. The vibration device according to claim 2, wherein the supporting portion of the retainer includes one or a plurality of plate springs.

11. The vibration device according to claim 2, wherein a groove extends continuously along an inner circumference of the retainer in a surface of the supporting portion of the retainer opposed to the second surface of the light transmissive body; and
a seal is provided to the groove.

12. The vibration device according to claim 2, wherein the light transmissive body includes:
a body portion; and
a frame portion on an outer edge of the body portion and having a thickness smaller than a thickness of the body portion;
the supporting portion of the retainer supports the frame portion; and
a thickness of the frame portion is about one-tenth or larger and about nine-tenth or smaller of a thickness of the body portion.

13. An imaging device comprising:
the vibration device according to claim 1; and
an image pickup device inside the vibration device.

14. The imaging device according to claim 13, wherein the retainer includes:
a side wall including a first end and a second end and surrounding an outer circumference of the light transmissive body; and
a supporting portion extending inwardly with respect to the side wall from the first end of the side wall;
the retainer is fixed to the vibration body at a portion in contact with the vibration body on a side of the second end; and
the supporting portion includes a supporting surface on a side of the second surface of the light transmissive body to support the second surface of the light transmissive body.

15. The imaging device according to claim 14, wherein at least one of adhesion between the one end of the vibration body and the first surface of the light transmissive body or adhesion between the supporting surface of the retainer and the second surface of the light transmissive body is provided by adhesive.

16. The imaging device according to claim 14, wherein the supporting portion of the retainer includes:

a first supporting portion extending inwardly with respect to the side wall from the one end of the retainer; and a second supporting portion projecting toward the second surface of the light transmissive body from a tip end of the first supporting portion and including the supporting surface; and a space is provided between the first supporting portion and the second surface of the light transmissive body.

17. The imaging device according to claim 16, wherein a width of the second supporting portion of the retainer in a direction in which the supporting portion extends is about 0.3 times or larger and about 3 times or smaller a thickness of the first supporting portion.

18. The imaging device according to claim 14, wherein the light transmissive body has a circular or substantially circular plate shape;

the vibration body and the retainer have a cylindrical or substantially cylindrical shape; and an inner diameter of the supporting portion of the retainer is equal to or larger than an inner diameter of the vibration body and smaller than about one-half of a sum of the inner diameter of the vibration body and an outer diameter of the light transmissive body.

19. The imaging device according to claim 14, wherein the light transmissive body has a circular or substantially circular plate shape;

the vibration body and the retainer have a cylindrical or substantially cylindrical shape; and an inner diameter of the supporting portion of the retainer is smaller than an inner diameter of the vibration body and smaller than about one-half of a sum of the inner diameter of the vibration body and an outer diameter of the light transmissive body.

20. The imaging device according to claim 14, wherein the retainer includes a second threaded portion on the side of the second end; and the vibration body includes a first threaded portion on a side of the one end of the vibration body to be threadedly engaged with the second threaded portion.

* * * * *